(12) United States Patent
Richmond

(10) Patent No.: US 9,500,347 B2
(45) Date of Patent: Nov. 22, 2016

(54) PACKAGE AND LIGHT DEVICE

(76) Inventor: Simon N. Richmond, Princeton, NJ (US)

(*) Notice: Subject to any disclaimer, the term of this patent is extended or adjusted under 35 U.S.C. 154(b) by 958 days.

(21) Appl. No.: 13/331,764

(22) Filed: Dec. 20, 2011

(65) Prior Publication Data

US 2012/0134135 A1 May 31, 2012

Related U.S. Application Data

(63) Continuation-in-part of application No. 12/236,340, filed on Sep. 23, 2008, now Pat. No. 8,104,914, which is a continuation-in-part of application No. 11/555,175, filed on Oct. 31, 2006, now Pat. No.
(Continued)

(30) Foreign Application Priority Data

Feb. 13, 2004 (AU) ................. 2004900700
Nov. 25, 2004 (AU) ................. 2004906746

(51) Int. Cl.
*F21L 4/08* (2006.01)
*F21V 21/08* (2006.01)
(Continued)

(52) U.S. Cl.
CPC .......... *F21V 21/0824* (2013.01); *H02S 20/00* (2013.01); *H02S 40/38* (2014.12); *B65D 2201/00* (2013.01); *F21S 8/08* (2013.01); *F21S 9/03* (2013.01); *F21V 17/007* (2013.01); *F21V 23/04* (2013.01); *F21W 2131/10* (2013.01); *F21W 2131/109* (2013.01); *F21Y 2101/02* (2013.01); *Y02E 10/50* (2013.01)

(58) Field of Classification Search
CPC ... H02S 40/38; H02S 20/00; B65D 2201/00;
F21S 8/08; F21S 9/03; F21V 17/007; F21V 23/04; F21W 2131/10; F21Y 2101/02; Y02E 10/50
See application file for complete search history.

(56) References Cited

U.S. PATENT DOCUMENTS 3,424,405 A 1/1969 Struble, Jr.
3,696,283 A 10/1972 Ackley, III
(Continued)

FOREIGN PATENT DOCUMENTS

AU 2004200419 2/2004

OTHER PUBLICATIONS

U.S. Appl. No. 29/255,246, Mar. 1, 2006, Simon N. Richmond.
(Continued)

*Primary Examiner* — Thomas M Sember
(74) *Attorney, Agent, or Firm* — Volpe and Koenig, P.C.

(57) ABSTRACT

A light device and package is disclosed including a light device with a diffuser and a light emitting element arranged so as to generate light through the diffuser which receives electrical power from an electrical power storage device recharged by a photovoltaic device with control circuitry arranged to control power supplied from the electrical power storage device. A test device is included having two conductors connected across a test switch. A device package is included having an opaque and light transmissive package portions and contains the light device and the two conductors. In a first configuration, the test switch is connected between the electrical storage device and the light emitting element via the two conductors, and in a second configuration, the test switch and the two conductors are disconnected from the light device. The test device can be used with multiple light devices and may be secured by a pull-tab.

14 Claims, 21 Drawing Sheets

Related U.S. Application Data 7,967,465, which is a continuation-in-part of application No. 11/279,729, filed on Apr. 13, 2006, now Pat. No. 7,377,667, which is a continuation-in-part of application No. 11/057,077, filed on Feb. 11, 2005, now abandoned, said application No. 12/236,340 is a continuation-in-part of application No. 11/107,940, filed on Apr. 15, 2005, now abandoned, application No. 13/331,764, which is a continuation-in-part of application No. 13/118,113, filed on May 27, 2011, now Pat. No. 8,262,245.

(60) Provisional application No. 61/396,580, filed on May 28, 2010.

(51) Int. Cl.
  *H01L 31/042* (2014.01)
  *H02S 40/38* (2014.01)
  *F21S 8/08* (2006.01)
  *F21S 9/03* (2006.01)
  *F21V 17/00* (2006.01)
  *F21V 23/04* (2006.01)
  *F21W 131/10* (2006.01)
  *F21W 131/109* (2006.01)
  *F21Y 101/02* (2006.01)

(56) References Cited

U.S. PATENT DOCUMENTS

| | | |
|---|---|---|
| 4,167,034 A | 9/1979 | Noguchi |
| 4,539,516 A | 9/1985 | Thompson |
| 4,568,868 A | 2/1986 | Schlepp et al. |
| 4,568,898 A | 2/1986 | Spinner |
| 4,786,851 A | 11/1988 | Fuji et al. |
| 4,794,272 A | 12/1988 | Bavaro et al. |
| 4,974,130 A | 11/1990 | Friedman |
| 5,055,984 A | 10/1991 | Hung et al. |
| 5,142,460 A | 8/1992 | McAtee |
| 5,149,188 A | 9/1992 | Robbins |
| 5,183,324 A | 2/1993 | Thomas |
| 5,417,605 A | 5/1995 | Chan |
| 5,686,809 A | 11/1997 | Kimura et al. |
| 5,691,578 A | 11/1997 | Driska |
| 5,791,773 A | 8/1998 | Babineaux |
| 5,807,157 A | 9/1998 | Penjuke |
| 5,811,958 A | 9/1998 | Yamamoto |
| 5,819,917 A | 10/1998 | Nicholson |
| 5,898,932 A | 4/1999 | Zurio et al. |
| 5,936,380 A | 8/1999 | Parrish |
| 6,016,038 A | 1/2000 | Mueller et al. |
| 6,020,823 A | 2/2000 | DeCicco |
| 6,112,414 A | 9/2000 | Andis et al. |
| 6,150,774 A | 11/2000 | Mueller et al. |
| 6,254,247 B1 | 7/2001 | Carson |
| 6,288,522 B1 | 9/2001 | Odaohhara et al. |
| 6,305,827 B1 | 10/2001 | Nolle |
| 6,356,054 B1 | 3/2002 | Herrmann |
| 6,459,919 B1 | 10/2002 | Lys et al. |
| 6,476,311 B1 | 11/2002 | Lee et al. |
| 6,511,197 B1 | 1/2003 | Kalemjian |
| 6,573,659 B2 | 6/2003 | Toma et al. |
| 6,608,453 B2 | 8/2003 | Morgan et al. |
| 6,812,398 B2 | 11/2004 | Yueh |
| 6,963,275 B2 | 11/2005 | Smalls |
| 6,977,479 B2 | 12/2005 | Hsu |
| 7,011,426 B2 | 3/2006 | Gabor |
| 7,040,776 B2 | 5/2006 | Harrell et al. |
| 7,048,403 B2 | 5/2006 | Parker et al. |
| 7,088,259 B2 | 8/2006 | Armbruster et al. |
| 7,285,934 B2 | 10/2007 | Chang |
| 7,497,588 B2 | 3/2009 | Browder |
| 7,513,638 B2 | 4/2009 | Allsop et al. |
| 7,967,465 B2 | 6/2011 | Richmond |
| 2002/0003697 A1 | 1/2002 | Chen |
| 2002/0053879 A1 | 5/2002 | Thoma et al. |
| 2002/0105794 A1 | 8/2002 | Hanscom et al. |
| 2002/0106624 A1* | 8/2002 | Chan .............................. 434/393 |
| 2005/0117344 A1 | 6/2005 | Bucher et al. |
| 2005/0279403 A1 | 12/2005 | Kube |
| 2006/0012978 A1 | 1/2006 | Allsop et al. |
| 2006/0027796 A1 | 2/2006 | O'Connor |
| 2007/0019401 A1 | 1/2007 | Liebowitz et al. |
| 2007/0183143 A1 | 8/2007 | Allsop et al. |
| 2011/0007499 A1 | 1/2011 | Bologeorges |

OTHER PUBLICATIONS

Seven (7) attached photographs taken by the Inventor, Simon N. Richmond in an unknown factory on Aug. 16, 2004 (unpublished) in Dongguan, China of a Color Changing Ornament Light Set with UL Approved Transformer UPC-A:012495746226 branded "Christmas Avenue" by Atico International, USA, Inc.
Report on the filing or determination of an action regarding a patent in U.S. Pat. No. 7,377,667 in Case No. 3:13-cv-01958, published on Apr. 2, 2013.
Report on the filing or determination of an action regarding a patent in U.S. Pat. No. 7,377,667 in Case No. 3:13-cv-01960, published on Apr. 2, 2013.
Report on the filing or determination of an action regarding a patent in U.S. Pat. No. 7,377,667 in Case No. 3:13-cv-04867, published on Sep. 15, 2014.
Report on the filing or determination of an action regarding a patent in U.S. Pat. No. 7,967,465 in Case No. 3:14-cv-04872, published on Sep. 16, 2014.
Report on the filing or determination of an action regarding a patent in U.S. Pat. No. 8,104,914 in Case No. 3:13-cv-01960, published on Apr. 2, 2013.
Report on the filing or determination of an action regarding a patent in U.S. Pat. No. 8,104,914 in Case No. 3:14-cv-04872, published on Sep. 16, 2014.
Defendant Rite Aid Corporation's Answer, Affirmative Defenses, and Counterclaims to Plaintiffs First Amended complaint in Case 3:13-cv-01958, published on Sep. 6, 2013.
Answer and Counterclaims of Import Specialties, Inc. And Strokin', LLC to Plaintiff's First Amended Complaint in Case 3:13-cv-01960, published on Aug. 5, 2013.

* cited by examiner

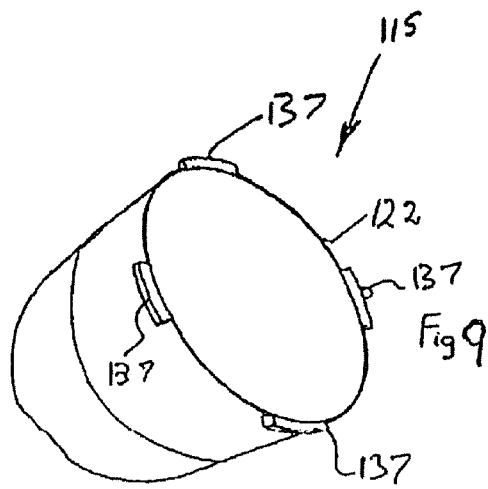
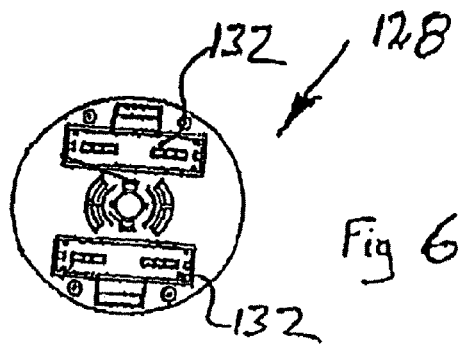
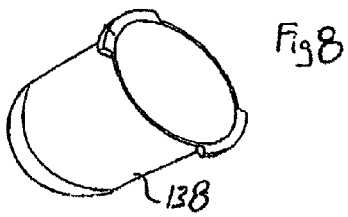
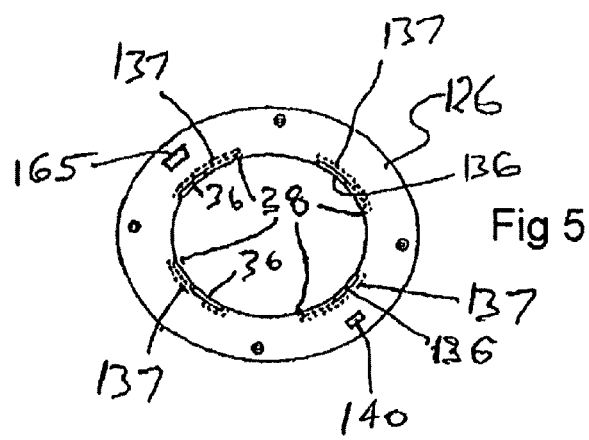
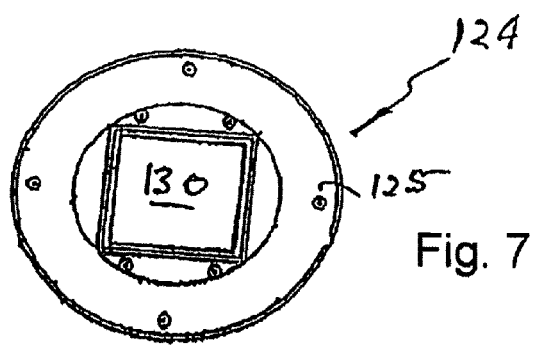

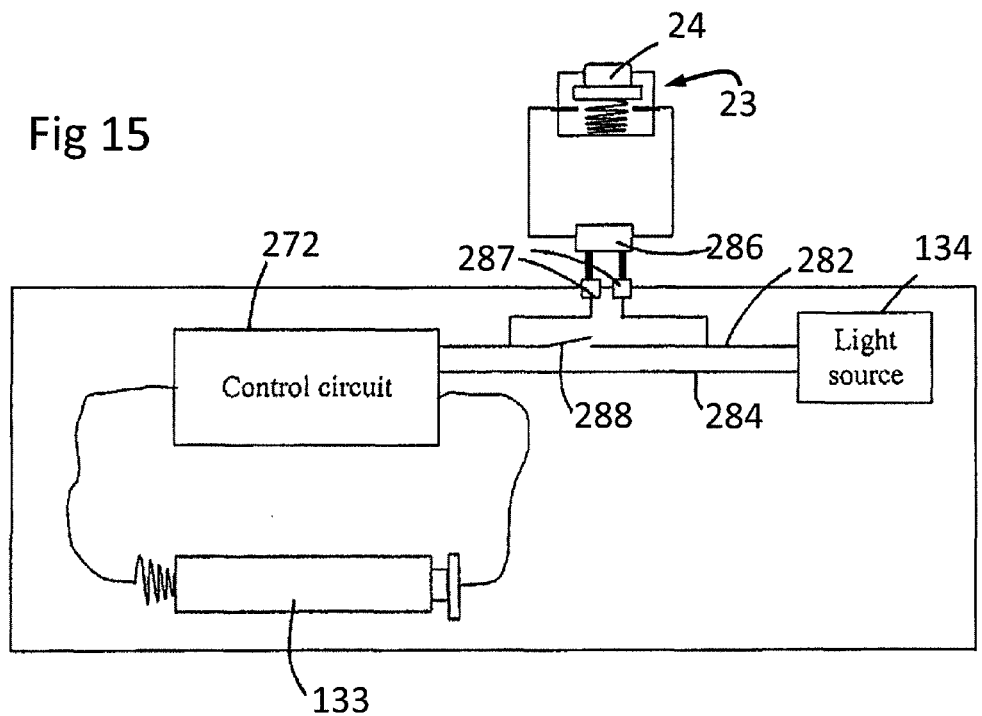
Fig 15
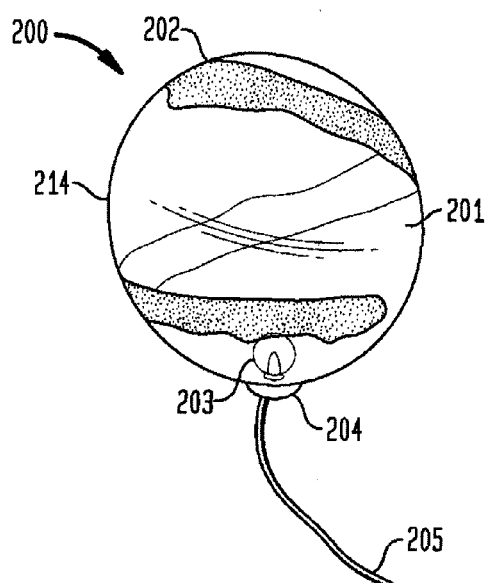
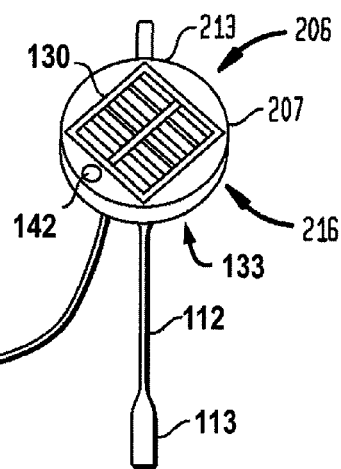
Fig. 16

PACKAGE AND LIGHT DEVICE

CROSS REFERENCE TO RELATED APPLICATIONS

This application is a continuation-in-part of U.S. patent application Ser. No. 12/236,340 filed on Sep. 23, 2008 by S. Richmond entitled "Light Device" which is a continuation in part of copending application Ser. No. 11/555,175 filed on Apr. 13, 2006, which is a continuation in part of copending application Ser. No. 11/279,729 filed on Apr. 13, 2006, which is a continuation in part of copending application Ser. No. 11/057,077 filed on Feb. 11, 2005, which claims priority from foreign application Australia Serial Number 2004900700 filed on Feb. 13, 2004, which are all incorporated herein by reference; is a continuation of copending application Ser. No. 11/107,940 filed on Apr. 15, 2005, which claims priority from foreign application Australian Serial Number 2004906746 filed on Nov. 25, 2004, which are all incorporated herein by reference; and is a continuation in part of copending U.S. patent application Ser. No. 13/118,113 filed on May 27, 2011 by S. Richmond entitled "Solar Pathway Light" which claims priority from U.S. Provisional Patent application No. 61/396,580 filed on May 28, 2010, the contents of which are hereby incorporated by reference.

BACKGROUND OF THE INVENTION

It is not uncommon, particularly in the marketing of toys, for an electrically operated toy to be operated while still in the packaging in order to attract purchases.

In respect of the above packaging access is provided to the controls of the toy so that a user may manipulate the controls to activate the toy.

Described in U.S. Pat. No. 6,020,823 is a device that can be attached to products to be sold. The device produces a light and/or sound upon being activated.

It is also known to package "Christmas lights" in a box containing a battery pack and a switch with the switch being provided to enable a user to activate the lights so the operation may be observed. When the lights are to be used, that is removed from the packaging, the battery pack is disconnected and the lights attached directly connected to a power source such as a transformer taking power from a mains power supply.

OBJECT OF THE INVENTION

It is the object of the present invention to provide a packaging that is usable to activate a product contained in the packaging.

SUMMARY OF THE INVENTION

A light device and package is disclosed including at least one light device having at least one diffuser with at least one light emitting element which receives electrical power from an electrical power storage device disposed during use in the light device. The at least one light emitting element is arranged so as to generate light through the at least one diffuser. A photovoltaic device for recharging the electrical power storage device is included with control circuitry arranged to control power supplied from the electrical power storage device to the at least one light emitting element during use. The light device and package further includes a test device having at least two conductors including a first electrical conductor and a second electrical conductor. A test switch is connected across the at least two conductors. The light device and package includes a device package having an opaque package portion and at least one light transmissive package portion. The device package contains the at least one light device and the at least two conductors. The test device is removably connected to the control circuitry, the test device being disposable in a first configuration wherein the test switch is connected between the electrical storage device and the at least one light emitting element via the at least two conductors, and a second configuration wherein the test switch and the at least two conductors are disconnected from the electrical storage device and the at least one light emitting element. In the first configuration, the test switch is supported by the device package to provide access to operate the test switch by a user located external from the device package. Some of the emitted light is viewable by a user through the at least one light transmissive package portion when the test switch is disposed by the user in the first configuration.

In the light device and package, the at least one light device includes a first light device and a second light device. The at least two conductors includes a first pair of conductors and a second pair of conductors. The test switch is connected across the first pair of conductors to the first light device and the second pair of conductors to the second light device such that each of the first and second pairs connect to the test device in the first configuration and the second configuration.

A light device is also disclosed including a light diffuser portion having an at least partly light transmissive region with at least one electrical light source mounted to emit light through a portion of the light diffuser portion. Conductive elements connect to the at least one electrical light source to a power supply unit that is positioned remotely from the at least one electrical light source. The power supply unit includes at least one photovoltaic panel, a housing portion having a lower housing portion, and at least one rechargeable power source disposed within the housing, wherein the at least one rechargeable power source is recharged by the at least one photovoltaic panel during normal use. Power supply connections electrically connect the at least one rechargeable power source via control circuitry and via the conductive elements to the at least one electrical light source. The control circuitry includes a control unit arranged to sense ambient light levels. A pole portion is included for elevating the at least one photovoltaic panel above a substrate. A ground spike is connected to the pole for securing the pole portion in the substrate wherein a lower external portion of the lower housing portion is exposed to ambient weather during normal use. The housing includes an access region disposed on the lower housing portion with an aperture formed through a surface of the access region. A cap portion is included movable by a user to cover and substantially shield the aperture from water ingress into an interior region of the housing. A disposable pull-tab is removably secured to the housing through the aperture wherein the disposable pull-tab is an insulator between the at least one rechargeable power source and the power supply connections. A portion of the disposable pull-tab extends from beneath the cap when the cap is positioned to cover the portion of the access region.

BRIEF DESCRIPTION OF THE DRAWINGS

A preferred form of the present invention will now be described by way of example with reference to the accompanying drawings wherein:

FIG. 5 is a schematic plan view of a moulding employed in the device of FIG. 3;

FIG. 6 is a schematic plan view of a base member of the device of FIG. 3;

FIG. 7 is a schematic to plan view of a cap assembly employed in the device of FIG. 3;

FIG. 8 is a schematic isometric view of a lens employed in the device of FIG. 3;

FIG. 9 is a schematic isometric view of a second lens employed in the device of FIG. 3;

FIG. 15 is an alternative arrangement for facilitating testing of the light device by a user.

FIG. 16 is a diagrammatic view of a further embodiment of the invention.

DETAILED DESCRIPTION OF THE PREFERRED EMBODIMENT

Figure 2:
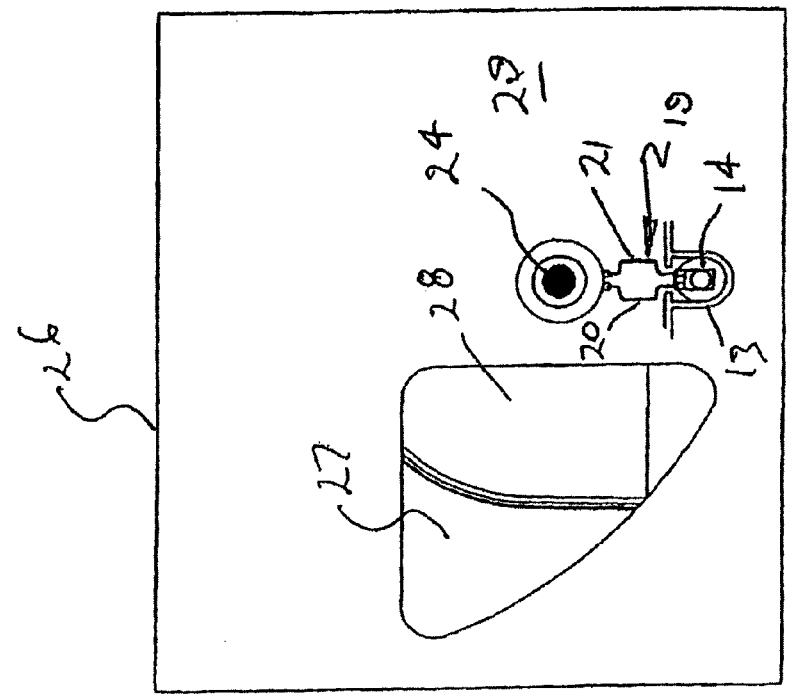
FIG. 2 is a schematic side elevation of the package and light of FIG. 1.
Figure 1:
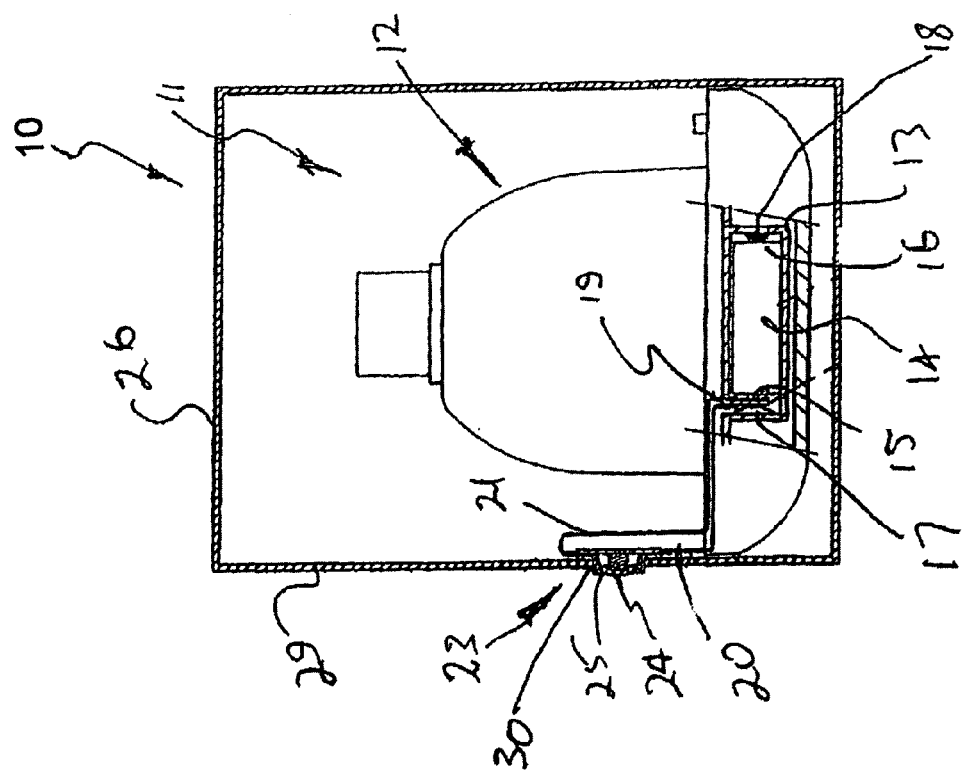
FIG. 1 is a schematic sectioned side elevation of a packaging containing a solar powered light.
Figure 3:
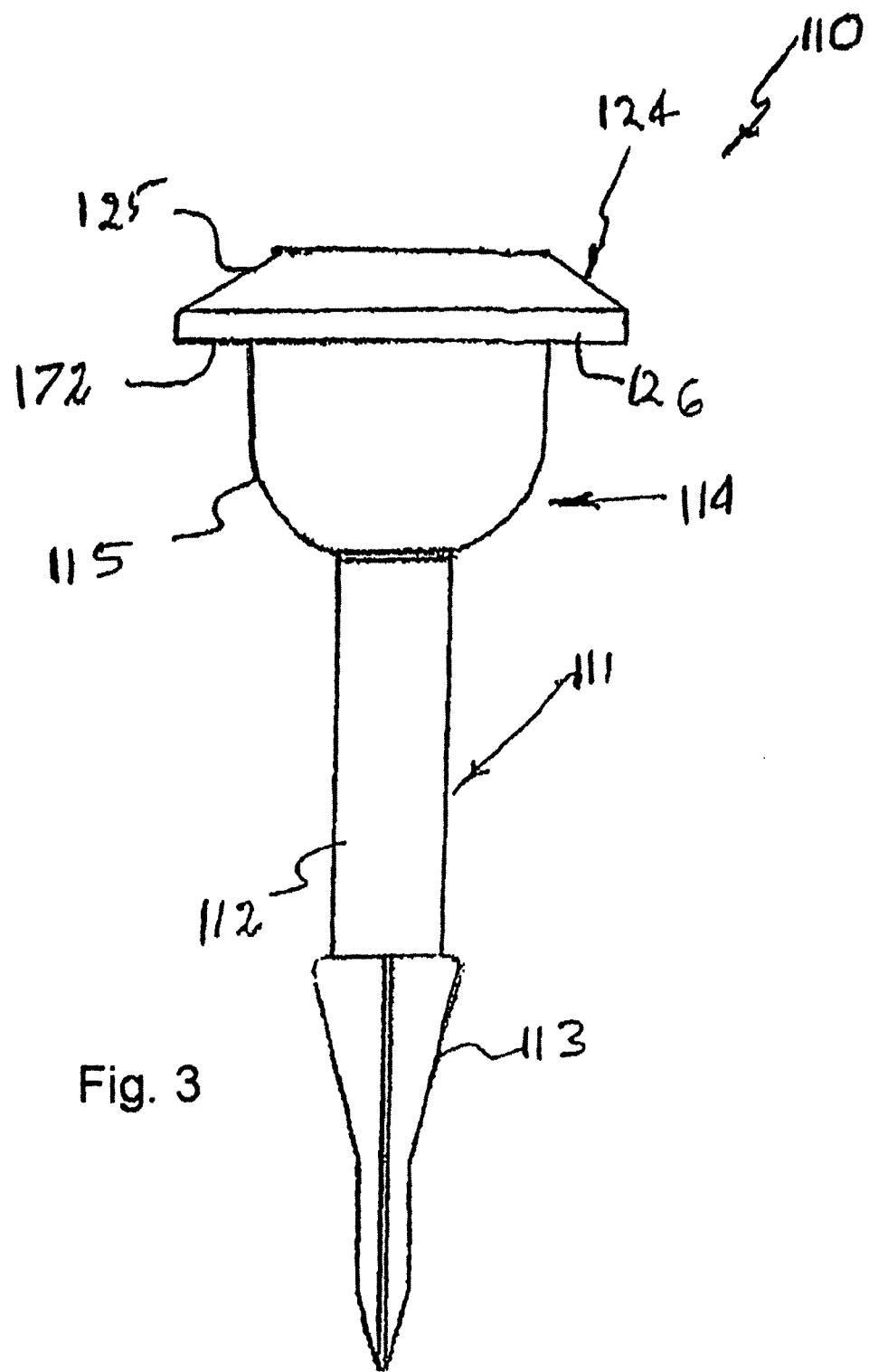
FIG. 3 is a schematic side elevation of a lighting device.
Figure 4:
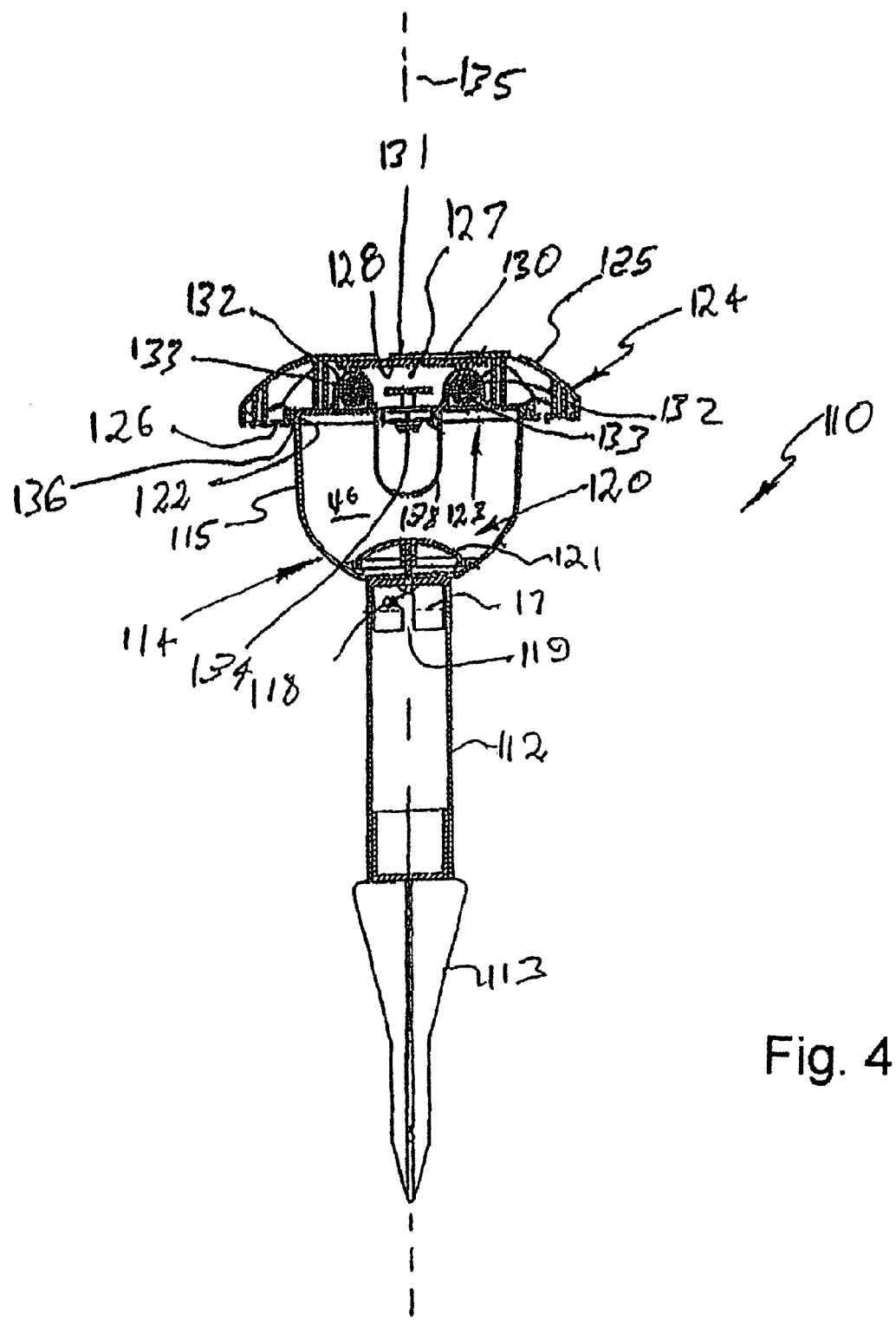
FIG. 4 is a schematic sectioned side elevation of the device of FIG. 3.
Figure 10:
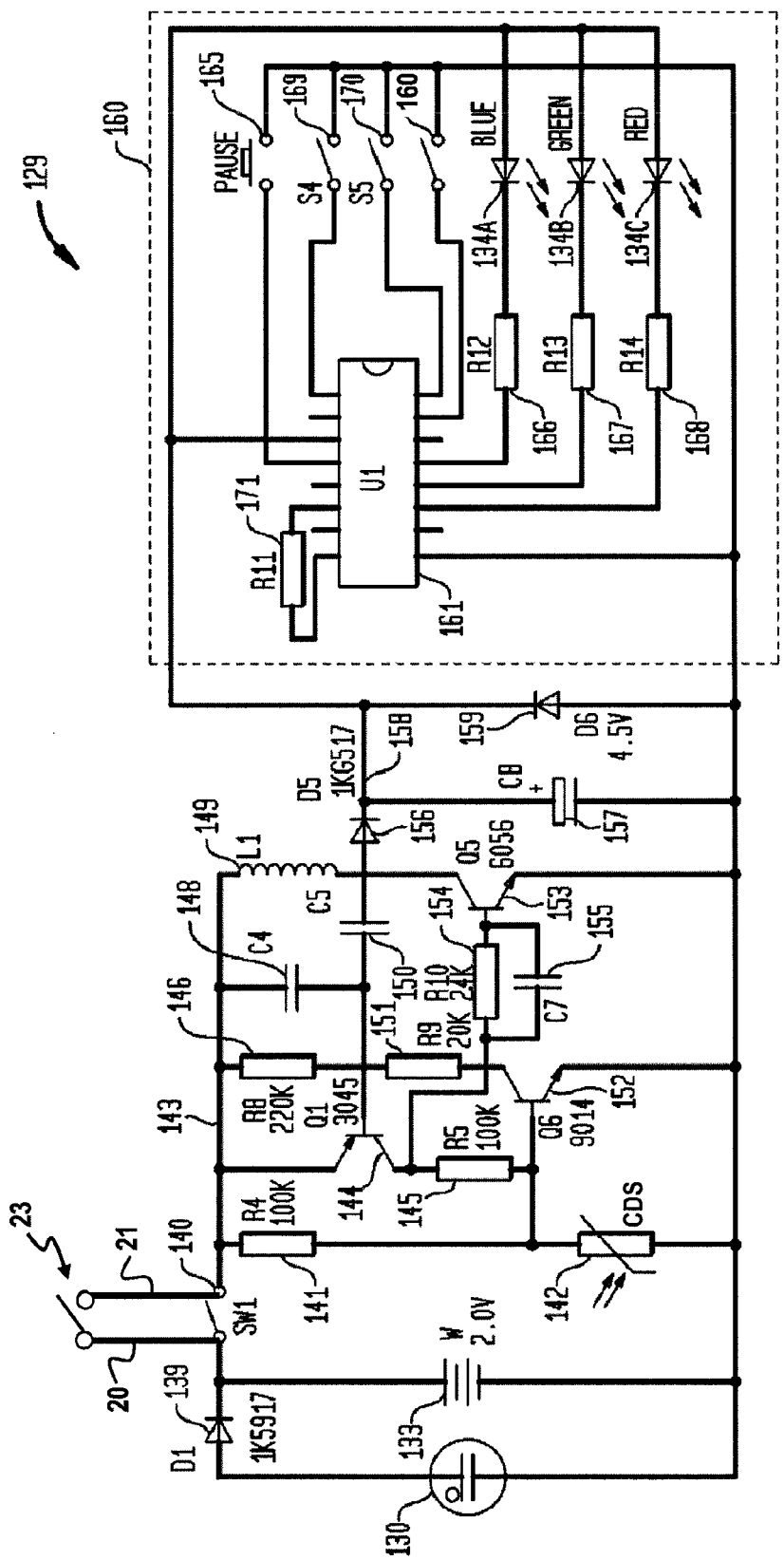
FIG. 10 is a circuit diagram of the circuit of the board of FIG. 6.

In FIGS. 1 and 2 of the accompanying drawings there is schematically depicted a packaging 10 containing a product 11. For example, a product 11 of this embodiment is a solar powered lighting device 110 such as the light assembly disclosed in Australian Patent Application 2004200419. The solar powered lighting device 110 is more fully described with reference to FIGS. 3 to 12 and is also described in the abovementioned Australian Patent Application including the circuit thereof. However the circuit includes a battery 14 contained in a battery compartment 13. The compartment 13 includes a positive terminal 17 and a negative terminal 18 that are to engage the corresponding terminals 15 and 16 of the battery 14. During normal use the negative terminals 15 and 17 are engaged and the positive terminals 16 and 18 are engaged. In this embodiment the terminal 18 is a spring that urges the terminal 17 into contact with the terminal 15.

Typically the battery 14 is charged when contained in the package 10, and the lighting device 110 includes a light sensitive switch (light sensitive resistor) that activates the lighting device 110 in the absence of light. Since the light sensitive switch is contained in the package 10 and therefore deprived of light its function is to activate the light. To prevent this, the circuit of the lighting device 110 is disabled by interruption of the circuit. In one particular example, the circuit is interrupted by placing insulation in the form of an insulator 19 between the terminals 15 and 17. The insulator 19 electrically isolates the terminals 15 and 17. The insulator 19 is a connector having conductive members (wires) 20 and 21 that extend to a switch 23. The switch 23 includes a button 24 that is urged to a disengaged position by means of a spring 25. When the button 24 is depressed it connects the members 20 and 21 so that electric power is delivered from the battery 14 to the remainder of the circuit of the lighting device 110 so that the lighting device 110 is activated. In view of the spring 25 the button 24 as mentioned is urged to the disengaged position. Accordingly by a user releasing the button 24 the switch 23 goes to the off position.

Preferably, the connector includes an elongated flexible strip having co-extensive longitudinally extending conductive strip portions separated by an insulating strip portion. The switch 23 when operated electrically connecting the conductive strip portions. The strip would be located between associated terminals 15 and 17, or 16 and 18. Preferably the connector is elongated so that the product 11 may be removed from the packaging 10 without the product 11 being disconnected from the switch 23.

Figure 12:
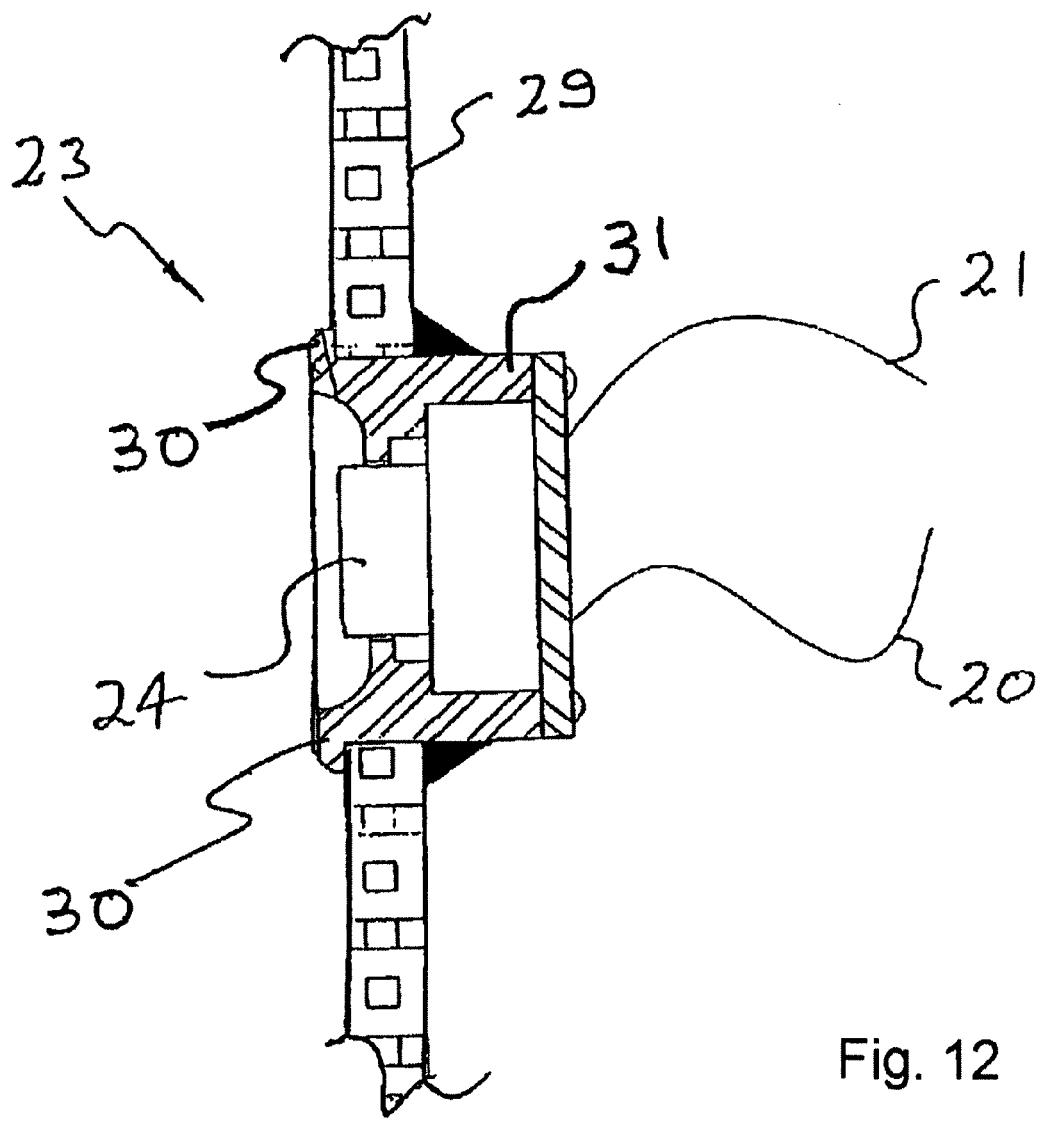
FIG. 12 is a schematic sectioned side elevation of a switch used in the package of FIGS. 1 and 2.

The abovementioned package 10 includes a box 26 having an aperture (window) 27 through which portion of the lens 28 may be viewed so that when the lighting device 110 is activated the light (including any coloured light) may be observed. The switch 23 is mounted on a wall 29 of the box 26. Although the switch 23 in FIG. 1 is illustrated protruding from the wall 27, preferably the button 30 is recessed (as shown in FIG. 12) so as not to protrude beyond the wall 29 so that when stacked the switch 23 cannot accidentally be activated.

The switch 23 includes a body 30 with an outwardly extending flange 31 that engages the wall 29 to inhibit displacement of the switch 23 inwardly of the wall 29 when the button 24 is depressed.

The insulator 19 would typically consist of a strip of plastics material within which the conductors 20 and 21 are embedded. A user of the product 12 when removing the product 12 from the box 26, removes the insulator 19 so that the terminals 15 and 17 become engaged. Typically the insulator 19 would pass through an aperture 30 in the battery compartment 13 and that by applying a force to the insulator 19 the insulator 19 slides from between the terminals 15 and 17. Under the influence of the terminal (spring) 18 the terminals 15 and 17 engage.

Accordingly the abovementioned circuit is disabled by the insulator 19 when engaged with the circuit, with removal of the insulator 19 from engagement of the circuit allowing normal operation of the circuit. However with the insulator 19 inserted operation of the circuit is possible by operation of the switch 23.

In FIGS. 3 to 12 of the accompanying drawings there is schematically depicted a lighting device 110. The device 110 of this embodiment is configured as a "garden light". The device 110 includes a body 111 including a post 112 from the lower end from which there extends a spike 113. The spike 113 is driven into a ground surface so that the post 112 is exposed above the ground surface.

Attached to the upper end of the post 112 is a lens assembly 114. The lens assembly 114 includes a lens 115 that encompasses a chamber 116. The lower end of the lens 115 has fixed to it a "bayonet" fitting 117 that engages a shaft 118 fixed to the upper end of the post 112. The fitting 117 includes an "L" shaped slot 119 through which the shaft 118 passes to secure the lens assembly 114 to the upper end of the post 112. The post 112 may not be included in the packaging 10.

The chamber 116 includes a lower portion 120 within which there is mounted an arcuate reflector 121 that is concave.

The lens 115 has a rim 122 surrounding the upper opening 123 of the lens 115.

Removably attached to the rim 122 is a cap assembly 124. The assembly 124 includes a cover 125 fixed to a base 126. The base 126 is located beneath the cover 125 and is shielded thereby. The base 126 and cover 125 encompass a chamber 127 within which there is a mounted moulding 128. The moulding 128 is provided with battery compartments 132. The components of the circuit 129 are located within the chamber 127, while the upper surface of the assembly 127 is provided with the solar cell 130. The cell 130 is exposed through a central rectangular aperture 131 of the cap 125.

Mounted within the chamber 127 via battery compartments 132 are rechargeable batteries 133 which are used to energise three LEDs 134. The LEDs 134 when illuminated produce red, green and blue light.

The cap assembly 124 is generally circular in configuration so as to provide the device 110 with a generally vertical longitudinal axis 135.

The base 126 has radially inward projecting flange segments 136 that engage with radially outward extending flange segments 137 of the rim 122 to be secured thereto. By angular movement of the cap assembly 124 about the axis 135, the segments 136 and 137 engage or disengage to secure or to release the assembly 124 with respect to the lens 115. As can be noted from FIG. 5, the flange segments 127 have end abutment portions 138 against which these segments 136 engage when the assembly 124 is secured to the lens 115.

Mounted on the under surface of the base 126 is a second lens 138. Accordingly, the LEDs 134 when activated have their light preferably diffused by the lens 138 and then further diffused by the lens 115. This in particular aids in producing a more evenly coloured light when the LEDs 134 are activated.

The circuit 129 powers and controls the lighting device 110 in accordance with an embodiment of this invention. The circuit 129 consists of a number of interconnected sub-circuits, including a power supply circuit, a light operated circuit, a boost-up circuit, a rectifier circuit, and a light circuit.

The power supply circuit comprises a solar cell 130 connected in series to a forward biased diode 139, which is in turn connected to a positive terminal of a battery 133. When in the package 10 the solar cell is preferably shielded from light. A negative terminal of the battery 133 is then connected to the solar cell 130 to complete the power supply circuit. In this example, the diode 139 is a model number IN5817 Schottky diode and the battery comprises two rechargeable 1.2 volt battery cells. It will be apparent to a person skilled in the art that other diode and battery configurations may be utilised without departing from the spirit and scope of the invention.

When the solar cell 130 is exposed to sufficient light, the solar cell converts some of the solar energy to electrical energy and creates a current that passes through the diode 139 to charge the battery 133. Thus, during the day the solar cell 130 converts energy from the sun to charge the battery 133. The diode 139 prevents the battery 133 from expending any power on the solar cell 130.

The power supply circuit is connected in parallel to the light operated circuit, which is connected across the terminals of the battery 133. The positive terminal of the battery 133 is connected to a switch 140, which is in turn connected to a 100 k.OMEGA. first resistor 141. The first resistor 141 is connected in series with a second, light-dependent resistor 142. The second resistor 142 connects to the negative terminal of the batteries 133 to complete the light operated circuit. The value of resistance of the second resistor 142 depends on the amount of light to which the second resistor 142 is exposed. When there is not much light, such as occurs during the night, the value of the second resistor 142 increases. During the daytime, when there is sufficient light, the value of the second resistor 142 decreases. Accordingly the resistor 142 allows the lighting device to operate only when there is insufficient light, ie night. When in the package 10 the resistor 142 is shielded from the light and therefore allows operation of the lighting device.

The boost-up circuit is connected to the light operated circuit, in parallel with the first resistor 141 and the second, light-dependent resistor 142. A first circuit node 143 is defined between the switch 140 and the first resistor 141. Connected to the node 143, is an emitter terminal of a first triode 144. A collector terminal of the first triode 144 is connected in series with a 100 k.OMEGA. third resistor 145. The third resistor 145 is then connected to a point between the first resistor 141 and the second resistor 142.

A 220 k.OMEGA. fourth resistor 146 is connected to node 143 across the emitter and base terminals of the first triode 144. In parallel with the fourth resistor 146, and also connected across the emitter and base terminals of the first triode 144, is a 4.7 nF first capacitor 148. Further connected to node 143, across the emitter and base terminals of the first triode 144 and in parallel with each of the fourth resistor 146 and the first capacitor 148, is a 100 .mu.H inductor 149 in series with a 1 nF second capacitor 150. The second capacitor is then connected to the base terminal of the first triode 144.

A 20 k.OMEGA. fifth resistor 151 is connected across the base and collector terminals of the first triode 144. Connected across the terminals of the third resistor 145 are the collector and base terminals, respectively, of a second triode 152. The emitter terminal of the second triode 152 is connected to the negative terminal of the batteries 133.

Connected between the inductor 149 and the second capacitor 150 is the collector terminal of a third triode 153. The base terminal of the third triode 153 is connected via an intermediary circuit to the collector terminal of the second triode 152. The intermediary circuit consists of a 2.4 k.OMEGA. fourth resistor 154 in parallel with a 1 nF third capacitor 155. The emitter terminal of the third triode 153 is connected to the negative terminal of the battery 133.

Also connected between the inductor 149 and the second capacitor 150 is the rectifier circuit. A forward biased second diode 156 is connected to a point between the inductor 149 and the second capacitor 150, and then to a positive terminal of a 33 .mu.F fourth capacitor 157. The negative terminal of the fourth capacitor 157 is connected to the negative terminal of the battery 133. A second circuit node 158 is defined between the second diode 156 and the fourth capacitor 157. Connected in parallel with the fourth capacitor 157, between the second node 158 and the negative terminal of the battery 133 is a reverse biased 4.5V third diode 159. The second diode 156, the fourth capacitor 157 and the third diode 159 comprise the rectifier circuit. Further connected to the second circuit node 158, in parallel with each of the capacitor 157 and the reverse diode 159, is a light circuit 160.

The light circuit 160 contains an integrated circuit (IC) 161 for controlling lighting effects provided by the lighting device 110. In the embodiment shown, the IC 161 is a 16-pin, three colour LED IC for controlling first, second and third light emitting diodes (LEDs) 134A, 134B and 134C. Each of pins 1, 15 and 16 is connected in series to respective switches 169, 170, 160. Each of the switches 169, 170 and 171 is then connected to the negative terminal of the battery 133. In one embodiment, the switches 169, 170, 171 correspond to the LEDs 134A, 134B, and 134C to enable or disable a particular colour range. In another embodiment, the switches 169, 170, 171 determine the frequency of a colour changing effect. In a further embodiment, the switches 169, 170, 171 determine the intensity of light emitted by each of the LEDs 134A, 134B, and 134C. Various combinations of the frequency and intensity of light are also possible. The switches 169, 170, 171 can be made accessible to a user to create custom lighting effects. Alternatively, the switches 169, 170, 171 are set according to a predetermined configuration and are not readily accessible by a user.

Pin 4 of the IC 161 enables an optional pause function. In this embodiment, pin 4 connects to a push button 165 that is, in turn, connected to the negative terminal of the batteries 133. Pin 3 of the IC 161 connects to the second circuit node 158.

Connected to the second circuit node 158, and in parallel with one another, are the first second and third forward biased light emitting diodes (LEDs) 134A, 134B and 134C. The first LED 134A is connected in series with a sixth resistor 166 that is connected to pin 13 of the IC 161. The second LED 134B is connected in series with a seventh resistor 167 that is connected to pin 12 of the IC 161. The third LED 134C is connected in series with an eighth resistor 168 that is connected to pin 11 of the IC 161. In this example, the first LED 134A is blue, the second LED 134B is green and the third LED 134C is red.

Pins 6 and 8 of the IC 161 are tied to one another via a ninth resistor 172, which in the embodiment shown is a 20K.OMEGA. resistor. The valve of the ninth resistor 171 determines the frequency of a colour change created by the IC 161. Accordingly, using different resistor valves for the ninth resistor 171 produces colour changes of different frequencies. Pin 9 of the IC 161 is tied to the negative terminal of the battery 133.

During the day, the solar cell 130 charges the battery 133. The value of the second resistor 142 is low and, consequently, small amounts of current flow through the boost-up circuit, rectifier circuit and light circuit. As night falls, the amount of energy converted by the solar cell 130 decreases. The resistance of the second resistor 142 increases and more current flows into the boost-up circuit, rectifier circuit and light circuit. This activates the LEDs 134A, 134B, and 134C in the light circuit and the light device 110 produces a changing light effect.

The integrated circuit 161 controls each of the first, second and third LEDs 134A, 134B, and 134C to produce a changing light effect for the light device 110. The integrated circuit varies the frequency and intensity of light emitted by the LEDs 134A, 134B, and 134C to produce a constantly changing kaleidoscopic effect. The light device 110 displays a constantly changing lighting effect that cycles through the light spectrum by ramping up and ramping down the intensity of light displayed by the LEDs 134A, 134B, and 134C.

Connecting the optional pause function of pin 4 of the IC 161 to the push button 165 enables a user to stop the changing light effect and maintain a constant colour. In this manner, a user can select a preferred colour for a lighting effect. The user observes the changing colour effect and when a desired colour is displayed, the user depresses the pause button 165.

The colour displayed at the time that the button is pressed then remains on. Preferably, the circuit retains sufficient charge such that a user selected colour is retained during the day and is displayed again when the light is reactivated the following evening. In this manner, the user does not have to reselect a desired colour each night. To reinstate the changing light effect, the user presses the push button 165 again and the changing light effect resumes.

In the embodiment shown in FIG. 9, the battery 133 powers the light circuit 160 during the night to produce light of varying colours and the user can optionally select a desired colour by pushing the push button 165. A selected colour is retained by memory in the IC 161. The memory may be a switch. Whilst the battery is powering the light circuit 160, the fourth capacitor 157 stores charge. As stated above, it is desirable for a selected colour to be retained and displayed on successive nights. As the battery 133 discharges, the output voltage of the battery 133 decreases. When the output voltage of the battery 133 is less than the stored voltage of the capacitor 157, the capacitor 157 discharges. Due to the presence and arrangement of the diodes 156 and 159, the capacitor 157 discharges through the light circuit 160.

The IC 161 preferably includes a cut-off circuit that is voltage dependent. As the capacitor 157 discharges, the voltage across the cut-off circuit decreases. Once the voltage across the cut-off circuit reaches a predetermined threshold value, the cut-off circuit prevents further power being consumed by the LEDs. As no power is being consumed by the light circuit 160, the capacitor 157 retains a residual charge. The residual charge maintains a voltage across the IC 160, which enables the selected colour to be retained by the memory in the IC 161.

During the next day, the solar cell 130 recharges the battery 133. As night falls, the resistance of resistor 142 again increases and the battery 133 provides sufficient power to the light circuit 160 to increase the voltage across the cut-off circuit above the predetermined threshold value. The LEDs are activated and the selected colour, as retained in the memory of the IC 161, is displayed. The voltage provided by the battery 133 is more than the stored charge of the fourth capacitor 157, so the capacitor 157 again begins to store charge.

It will be readily apparent to a person skilled in the art that there are many circuit variations possible for enabling and controlling the lighting display, without departing from the spirit and scope of the invention.

The switch 140 and/or switch 165 is/are mounted on the base 126 so as to be on a downwardly facing external surface 172 of the base 126. This enables a user to control the device via readily accessible switches, without needing to remove the cap assembly 124. The switches 140 and 165 are each operable to control delivery of electric power from the batteries to the LEDs 134A, 134B and 134C. The circuit 129 is only rendered operative when there is insufficient light, that is, by operation of a light sensitive switch, i.e. the diode 142.

Figure 11:
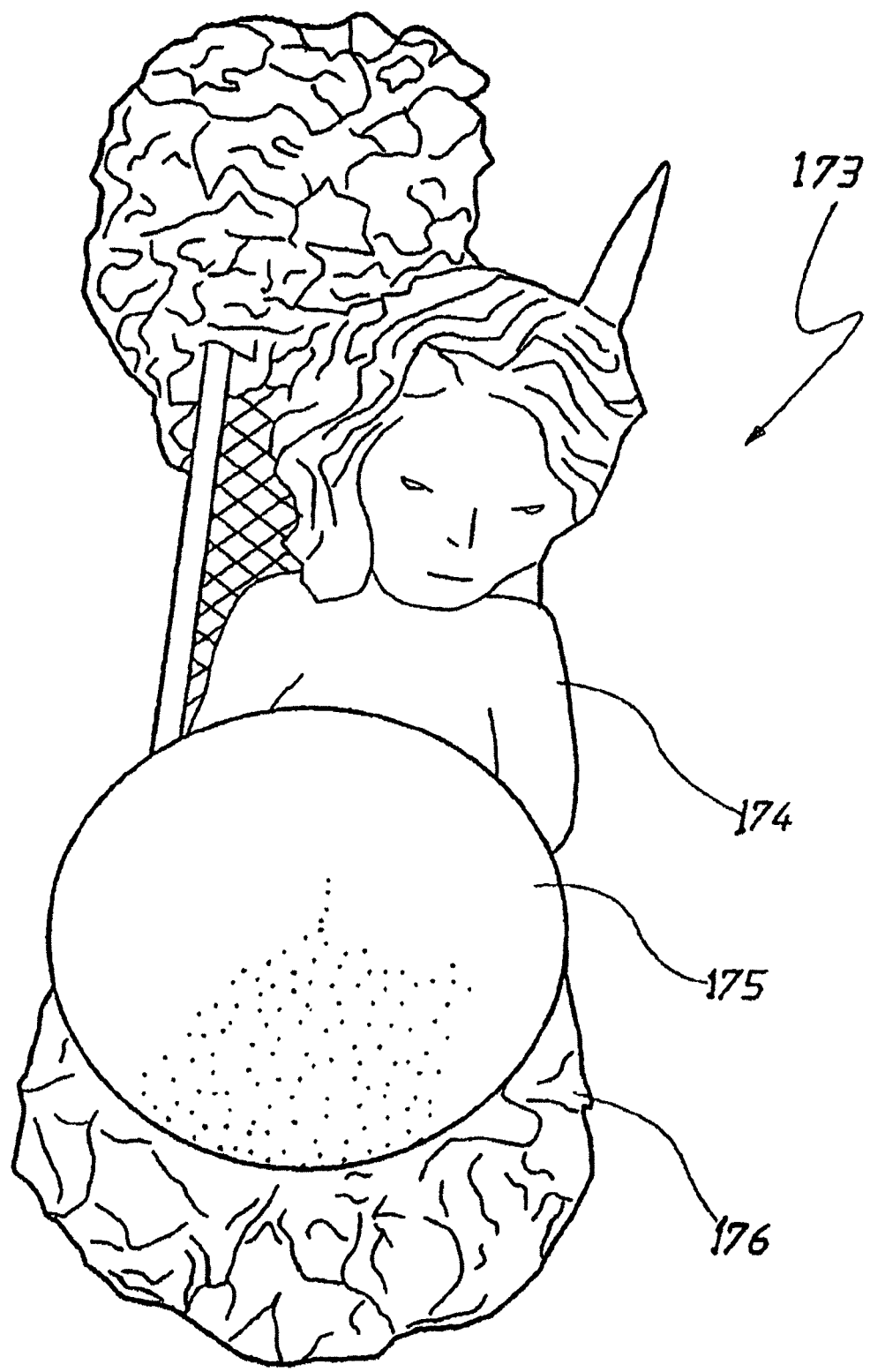
FIG. 11 is a schematic perspective view of an ornamental garden light.

The embodiment of FIG. 11 includes an ornamental garden light 173 having a body or base 174. The base 174 would be at least partly hollow so as to contain the circuitry of FIG. 9, except for the solar cell 130. The solar cell 130 would be mounted so as to be exposed to sunlight. The switches 140 and 165 would be mounted at an external surface of the base 174.

The switch 140 and/or switch 165 would be mounted on an external surface of the base 174, while the diode 142 would be exposed to sunlight.

The base 174 includes a spherical lens 175 secured to a horizontal portion 176 of the base 174. The horizontal portion 176 would have mounted in it the LEDs 134A, 134B and 134C so as to deliver light to the interior of the lens 175.

In the embodiments of FIGS. 3 to 10 and 12, the previously described switch 23 and associated wires 20 and 21 are arranged in parallel in respect of the switch 140. Accordingly like the previous embodiment, a user may operate the switch 23 while the lighting device 110 is still in the packaging 10, to thereby have the lighting device 110 produce a light varying colour.

The wires 20 and 21 are detachably connected to the device 110 so that upon removal of the device 110 from the packaging 10, the wires 20 and 21 detach from the device 110 so as to stay with the packaging 10.

In the above described preferred embodiments the solar cell, such as the solar cell 130, and the light sensitive switch, such as the light sensitive switch 142 are shielded from light, preferably they are shielded from light by being contained within the package 10, although the package 10 includes an aperture (window) 27. Accordingly, the light s sensitive switch enables operation of the lighting device. In some instances, the solar cell is used as the switch to enable operation of the circuit. For example, when the solar cell ceases to produce a current, the lighting device is then operable to produce a light. While the solar cell is producing a current greater than a predetermined current, the light circuit is disabled. Accordingly, in such constructions having the solar cell shielded from light enables operation of the device.

In the above described embodiments the switch 23 is in parallel to the switch 140, but renders the switch 140 ineffective until the strip (insulator 19) is removed.

Figure 13:
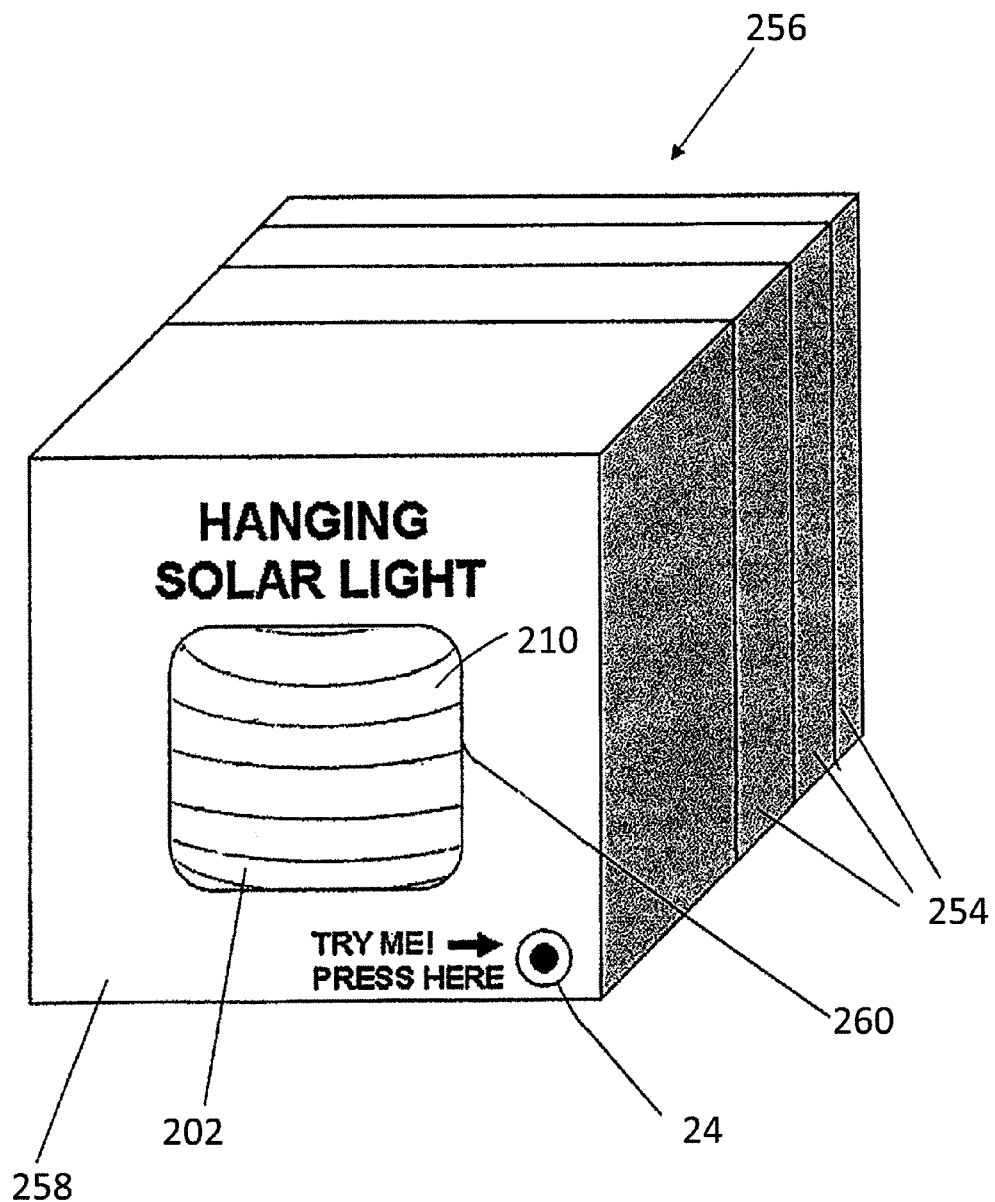
FIG. 13 is a diagrammatic perspective view of an alternative display package.

An alternative display package 256 is shown in FIG. 13. With this package 256, several device packages 254 having a light device 202 disposed in the contracted configuration are provided, and one device package 258 with the light device 202 disposed in an expanded configuration is provided. In this way, it is possible to save space by providing the majority of the light devices 202 in the contracted configuration, whilst enabling a prospective purchaser to view the light device 202 in the expanded configuration. Support devices for use with the light devices 202 may be packaged separately to the device packages 254, 258.

As an alternative, only one device package may be provided, with one device in an expanded configuration and several devices in a contracted configuration disposed in the package. Individual light devices may be separated using any suitable divider, for example formed of cardboard material.

The device package 258 includes a window and, in this example, a test button 24 which, when pressed, supplies power to the LED 134 so as to illuminate the body 210.

Figure 14:
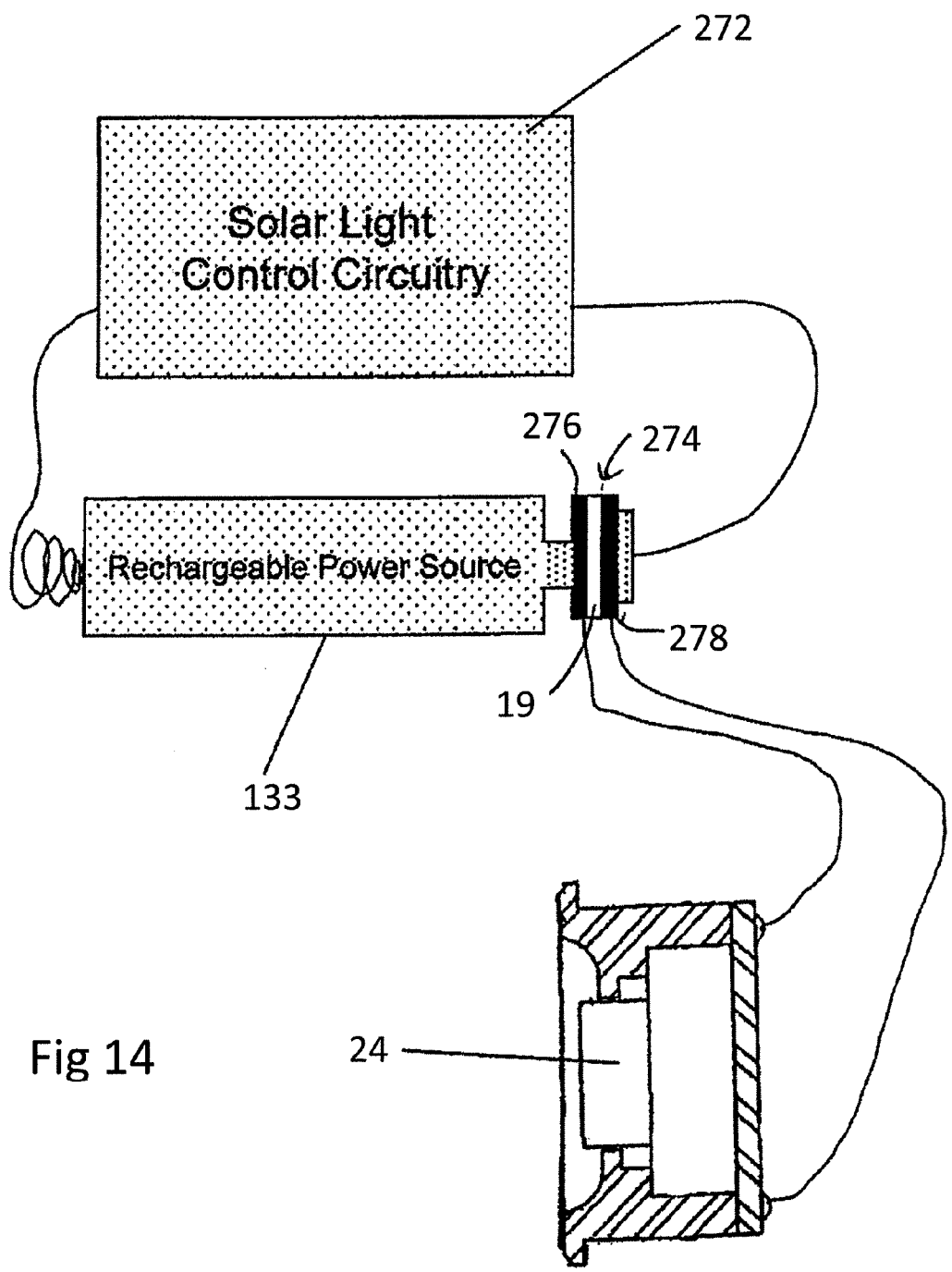
FIG. 14 is a schematic diagram of a test arrangement for facilitating testing of the light device by a user.

As shown in FIG. 14, the test arrangement is associated with a rechargeable power source 133 which may be a rechargeable battery, and the light device includes control circuitry 272 arranged to control and determine operation of the light device 202, for example so as to cause the light device 202 to operate in a similar way to the embodiment described in relation to FIGS. 1 to 6 of U.S. patent application Ser. No. 11/279,729 already incorporated by reference above.

Disposed between the rechargeable power source 133 and the control circuitry 272 is an insert 274 which has a first conductor 276 connected to the rechargeable power source 133 and the button 24, a second conductor 278 connected to the control circuitry 272 and the button 24, and an insulator 19 disposed between the first and second connectors. The arrangement is such that the rechargeable power source 133 is isolated from the control circuitry 272 until the button 24 is pressed. When the button 24 is pressed, an electrical connection is made between the first and second conductors 276, 278 and thereby between the rechargeable power source and the control circuitry 272.

An alternative test arrangement is shown in FIG. 15, wherein instead of disposing the button 24 between the rechargeable power source 133 and the control circuitry 272, the button 24 is disposed in parallel with one of two power supply wires 282, 284 extending from the control circuitry 272 to a light source 134, in this example a first power supply line 282. The button 24 is connected to a plug 286 engageable with and disengageable from a socket 287, and disposed in line with the first power supply line 282 is a bypass switch 288. The arrangement is such that during a test mode, the plug 286 is engaged in the socket 287 and the bypass switch 288 is open. In this mode, the light source is prevented from receiving electrical power until the button 24 is pressed. During an operation mode, the plug 286 is disengaged from the socket 287 and the switch 288 is moved to a closed position. In this mode, the light source receives power through the first and second power supply lines, with an electrical current passing through the closed switch 288.

When a person is considering purchasing the light device 202, the person may wish to open the device package 258 in the retail store so as to more closely inspect the light device 202. In order to avoid creation of tension between the test button 24 and the insert 274 which may result in damage to the wiring system of the device packaging 258, one or more of the wires extending between the test button 24 and the insert 274 may be folded back on itself and the folded portion potted with glue or resin. This creates a strain relief point.

In order to reduce the likelihood that insufficient power is available for a user to test the light device by pressing the test button 24, one or more additional batteries may be included. The or each additional battery may be a rechargeable or non-rechargeable battery and in one arrangement, the additional battery is disposed in parallel or in series with the rechargeable battery 133.

In a further embodiment, a plurality of body portions are provided, each body portion having at least one associated light emitting element, and the body portions being disposed in a generally linear configuration during use.

FIG. 16 is a diagrammatic view of a further embodiment of the invention disclosed in U.S. application Ser. No. 11/968,504.

In the embodiment illustrated in FIG. 16, the light device 200 includes a lens portion 214 which may be made from plastic, glass, resin or other suitable light transmissive material or combination thereof. Preferably, the lens portion 214 is made from hand-blown glass. Preferably the lens portion 214 is substantially spherical except for its lower extremity. In the present embodiment, the lens portion 214 has an internal layer of fluorescent or phosphorescent material or pigment 202 on part of the spherical inside wall thereof. In the present embodiment the pigment 202 is formed in the shape of a rising swirl. Alternatively, the glass may be impregnated directly with phosphorescent pigment. The lens portion forms a chamber and is substantially constructed from hand-blown glass which may have different colored glass elements providing some contrast 201. The lens portion 214 may further comprise fluorescent and luminescent elements within it 202. The lens portion 214 is preferably sealed to prevent moisture from reaching the fluorescent and luminescent elements 202. Thus there is a light emitting outdoor fixture 200 having a hollow light transmissive lens 214, which is partially impregnated or coated with a light transmissive phosphorescent element 202.

Attached to the lens portion 214 is a base portion 204 which is preferably made of a thermoplastic but may be made from metal or other suitable material or combination thereof. Preferably, the base portion 204 is attached to the lens portion 214 at the lower extremity of the lens portion 214. Directed into and/or disposed within the lens portion is an electrically powered light source 203, preferably at least one light emitting diode (LED). The LED 203 is preferably supported by the base 204. Connected to the LED 204 in the base portion 204 via conductive elements 205 is a remote power supply unit 206.

Alternatively or additionally, the phosphorescent material 202 may be coated with a light transmissive waterproof coating. Preferably, the LED 203 emits at least some ultraviolet light within the lens portion 214. Electric current is connected to the LED 203, causing the LED 203 to emit ultraviolet light to strike the phosphorescent material 202, and therefore the phosphorescent material is caused to emit visible light. Further, the inside space of the lens portion may be an empty space. Thus there is an illuminated fixture comprising an LED 203 located proximate to a light transmissive lens portion 214 whereby the lens portion 214 is illuminated from within by the LED 203.

This is achieved because a substantial percentage of the light emitted by the LED is in the ultraviolet light spectrum so that the LED emits at least some light in the blacklight ultraviolet wavelength spectrum.

At least some part of said lens portion 214 exhibits fluorescence when excited by said LED 203 and exhibits phosphorescence by emission of light by a luminescent element 202 after excitation by the LED 203 has ceased. The provision of the ultraviolet (UV) emitting LED 203 proximate to the phosphor 202 assures that upon activation of the LED 203, the phosphor 202 is excited and continues to phosphoresce after the LED 203 has been deactivated.

Regardless of the application method, once the phosphorescent material 202 is proximate to the surface of the lens portion 214, the LED 203 directed into or located within the lens portion 214 affords a highly efficient excitation of the phosphor 202 resulting in efficient phosphorescent emission. An LED 203 operative in the present invention preferably emits some either UV-A light corresponding to between 315 nanometers (nm) and 405 nm wavelength or UV-B light corresponding to between 280 nm and 320 nm wavelengths. The operative LED 203 herein may include gallium indium nitride and gallium nitride. Preferably, the light source 203 is oriented to direct a majority of the emission there from into and outward through the lens portion 214.

The conductive elements 205 are preferably releasably connected to either or both of the base 204 or the remote power supply unit 206. A plug and socket arrangement facilitates the connection and release of the conductive elements 205 with the base 204 and/or the remote power supply unit 206. The lens portion 214 is usually installed in a stone or polyresin pedestal base or metal frame that is sold separately.

In FIG. 16, the power supply unit 206 has a housing 207 that is preferably made from two upper and lower plastic parts mated together. The two housing 207 parts are preferably connected together using stainless steel screws. Also disposed within the lower portion of the housing 207 is a battery access panel to access batteries 133.

Disposed upon the surface of the power supply unit 206 are several photovoltaic panels 130 that in the present embodiment are of a crystalline silicon structure. Preferably the solar panels are assembled using a lamination process as opposed to an epoxy encapsulation process. As an alternative, one or more amorphous silicon type solar panels may be used. Disposed within the power supply unit 206 is a rechargeable power source which is recharged by the solar panels 130. In this embodiment the rechargeable power source is in the form of two AA size 600 mA/hour nickel cadmium batteries 133 (not shown). Alternatively, other rechargeable power sources may be used including one or more nickel metal hydride batteries, rechargeable alkaline batteries, lead acid batteries, lithium ion batteries or similar. Access to the batteries for replacement is through a user accessible battery compartment (not shown) located on the underside of the power supply unit 206. A power supply circuit connects the solar panels 130 in series to a forward based diode, which is in turn connected to a positive terminal of at least one battery 133. A negative terminal of the battery 133 is then connected to the solar panel 130 to complete a power supply circuit. In this example the diode may be a model number IN5817 Schottky diode. It will be apparent to a person skilled in the art that other diode and battery configurations may be utilized without departing from the spirit and scope of the invention. When the solar panel 130 is exposed to sufficient light, the solar panel 130 converts some of the solar energy to electrical energy and creates a current that passes through the diode to charge the battery 133. Thus, during the day the solar panel 130 converts energy from the sun to charge the battery 133. The diode prevents the battery 133 from expending any power on the solar panel 130.

Attached to the power supply unit 206 is a pole 112 attached to a ground stake 113 for affixing the power supply unit 206 in an upright position into a ground surface. The length of the pole 112 is preferably of sufficient height to raise the power supply unit 206 above the height of pooled water during rain. The length of the pole 112 is may also be of sufficient height to raise the power supply unit 206 above surrounding ground shrubbery to ensure the solar panel 130 is exposed to sunlight.

The housing 207 is preferably attached to the pole 112 with a user operable hinge 213 (not shown) that allows the angle of the housing 207 relative to the pole 112 to be adjusted parallel to the pole 112. The angle of the housing 207 is adjusted at the time of packaging to facilitate slimmer packaging and then adjusted by the user at the time of installation to face the midday sun to ensure the photovoltaic cells 130 receive the maximum solar energy. In higher latitudes this angle increases from the horizontal as the installation location is located towards the north and south poles.

Also located within the power supply unit 206 is a control unit 216 (not shown) which may be arranged to sense the ambient light level, for example, in the present example, a light dependent cadmium sulfide resistor 142 located in a light exposed location on the power supply unit 206, and if a determination is made by the circuit that insufficient ambient light is available, a connection is made between the batteries 133 and the light source 203. If a determination is made that sufficient ambient light is available, a connection is not made between the batteries 133 and the light source 203 and current does not flow from the batteries. Specifically, the positive terminal of the battery 133 is connected to a switch (not shown), which is in turn connected to a 100 kΩ first resistor (not shown). The first resistor is connected in series with a second, light dependent resistor 142. The second resistor 142 connects to the negative terminal of the batteries 133 to complete the lighting circuit. The value of resistance of the second resistor 142 depends upon the amount of light to which the second resistor 142 is exposed. When there is not much light, such as occurs at night, the value of the second resistor 142 increases. During the daytime, when there is sufficient light, the value of the second resistor 142 decreases. Accordingly, the resistor 142 allows the lighting circuit to operate only when there is insufficient light, i.e. at night.

Preferably the lens portion 214 is electrically illuminated for at least six hours.

The control unit 216 may serve to automatically vary the brightness of the LED 203. Optionally, the cycle includes a period of no emission to allow for isolated visible phosphorescence emission. When multiple light sources 203 are present, it is appreciated that two or more light sources having different emission characteristics can be controlled to afford different illumination levels and therefore a varying color emission.

Further, the control unit 216 may selectively activate the LED 203 in a time pulsed manner. Preferably, when the light source 203 is a UV LED, the UV LED is activated in a time pulsed manner by the controller 216 consistent with the decay time of the phosphor pigment.

The light device 200 may also be arranged to receive power directly from an external power source, for example by providing the light device 200 with an appropriate step-down transformer (not shown) connectable to mains AC electrical power, and appropriate AC to DC conversion circuitry instead of connection to the remote power supply unit 206. In addition, the light device 200 may be arranged to additionally receive power from an external power source and to use the power to recharge the batteries 133 in the remote power supply unit 206.

The electrical light source 203 may flicker with a candle like appearance. In order to cause the electrical light source 203 to flicker, the control unit 216 may be provided with an inverter (not shown) and the inverter controlled so as to generate an alternating current which causes the electrical light source 203 to mimic the characteristic flicker of a flame. Alternatively, an irregular oscillating input may be applied to a switching transistor so as to cause irregular switching of current through the LED 203. Appropriate biasing signals for the switching transistor may be generated using multiple oscillators, each of which is arranged to oscillate at a different frequency. For example, a base of the switching transistor may be connected to outputs of multiple Schmitt trigger oscillators arranged to oscillate at different frequencies, the Schmitt trigger oscillators for example being constructed using a CMOS40106 Hex inverting Schmitt trigger integrated circuit.

The control unit 216 may be controllable so that the light source 203 is caused to flicker or to not flicker, for example based on the position of a manually operable switch.

The light source 203 may also or instead include a colored light or a light capable of being used to provide varying colors. As the glass in the lens portion 214 is preferably of more than one colored glass, the different colors produced by the light source 203 appropriately illuminate the corresponding colors within the glass of the lens portion 214. The light source 203 may include at least one of a red, green, blue and at least one of an ultraviolet emitting light source such that the fluorescent pigments 202 are excited by the ultraviolet light and the colors in the glass 201 are alternatively illuminated by the changing colors of the spectrum produced by the changing interaction of the different colored light sources. Alternatively there may be at least two different colored light sources 203 instead of three.

FIGS. 17, 18, 19 and 20 show inverted views of an alternative embodiment of the housing 206. Disposed on the lower surface of the housing 206 is a recessed partially oval shaped access region 908 which is preferably recessed in the lower surface of the housing 206 is a resilient cap 902 preferably affixed by a tether to the housing 206 at one end to avoid the cap 902 becoming lost or dropped during use. The access region 908 preferably has side walls and a rim to snugly and securely mate with the resilient cap 902 when the resilient cap 902 is pressed by a user into the access region 908. The resilient cap 902 is preferable made of an at least partially light transmissive material such as polyvinylchloride (PVC) or silicon rubber.

Figure 17:
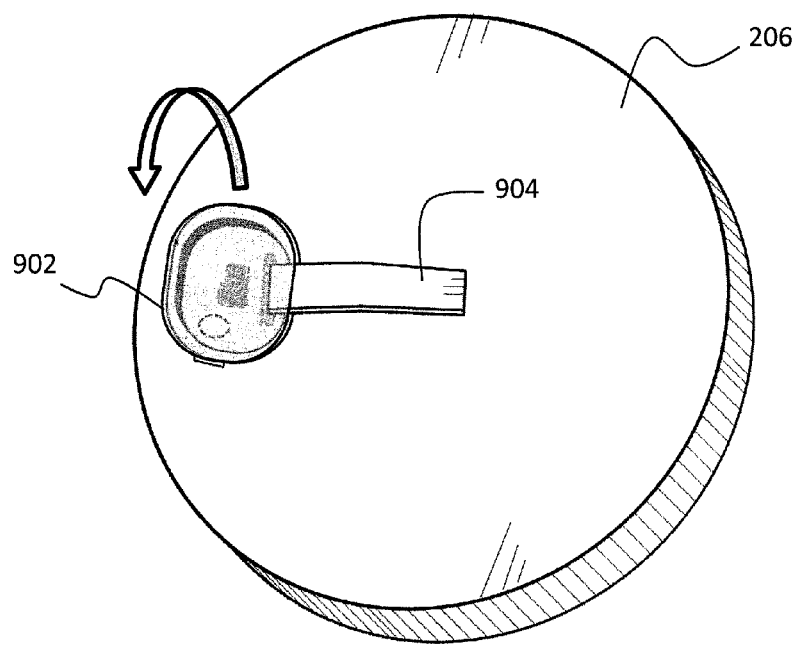
FIG. 17 is a first inverted view of an embodiment of a control housing of the lighting device in accordance with the present invention.

As shown in FIG. 17, when the user 506 removes the new lighting device 200 from its packaging after purchase, a flexible pull tab 904 extends from beneath the closed cap 902. There may be indicia or words printed on the pull tab 904 to instruct the user such as "Open cap, Pull tab to activate, close cap before use". Because the pull tab 904 extends beneath the visible portion of the cap 902, it is apparent to a user to access the access region 908 by removing the cap 902 from its position mated to the access region 908. The pull tab 904 acts as an insulator between a rechargeable battery 133 and internal battery connections that connect the battery 133 via circuitry to the electrical light source or sources 203. When the pull tab 904 is removed, with any optional switch in an "ON" position, and the ambient light levels are low, an electrical connection is made between the battery 133 and the battery connections (not shown) and then the lighting device 200 will function normally for normal use. In the embodiment shown in FIGS.

17, 18, 19 and 20, a switch 140 is co-located in the access region 908. This switch 140 may have the function of switching between various lighting modes or light sources. For example, the switch 140 may be a two position single pole slide switch with one position putting the lighting device 200 into a mode whereby only a single color of light is emitted by the lighting device 200 such as white light. In the second position, the lighting device 200 would be put into a mode whereby a continuous cycle of changing colors is emitted by the lighting device 200. Alternatively the switch 140 may be a push switch or a rotational switch.

Alternatively, instead of being located on a vertical side of the housing 206, the ambient light sensor 142 may be located on the lower surface of the housing 206 within the access region 908. Since the cap 902 is light transmissive, the ambient light sensor 142 is able to operate from beneath the cap 902 when the cap 902 is mated with the access region 908.

Figure 19:
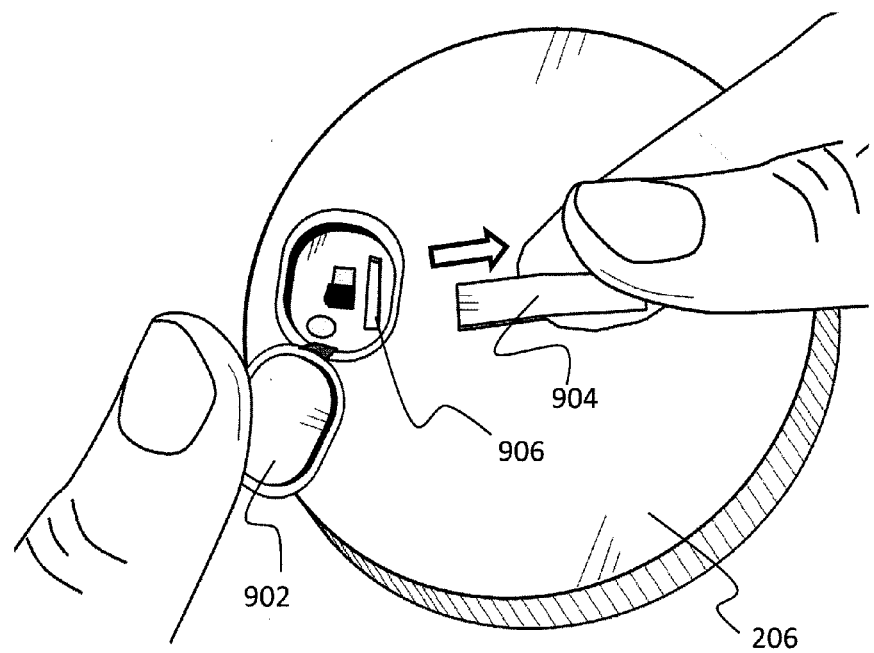
FIG. 19 is a third inverted view of the housing of FIG. 17.

As shown in FIG. 19, the user, as instructed, removes the new lighting device 200 from its packaging after purchase, pulls on the pull tab 904 and removes it from the slotted aperture 906 located in the access region 908.

Figure 20:
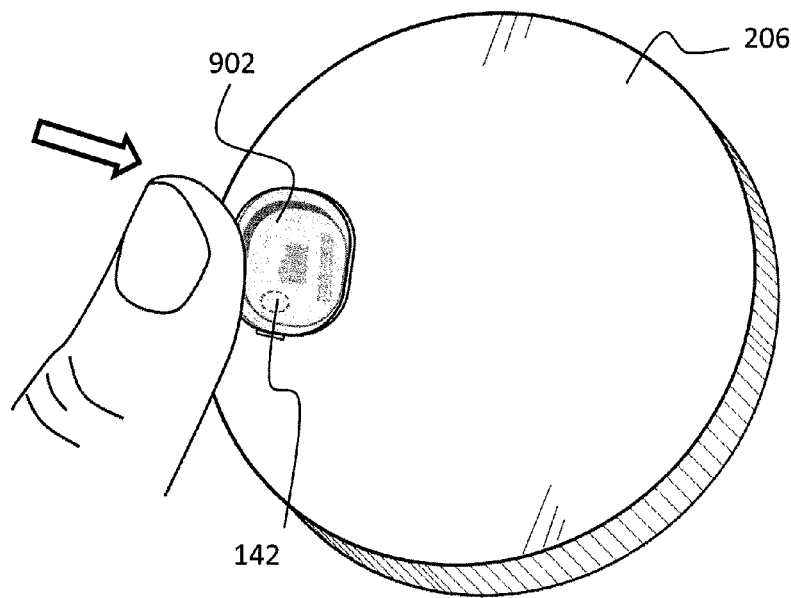
FIG. 20 is a fourth inverted view of the housing of FIG. 17.

As shown in FIG. 20, the user then places the cap 902 over the access region 908 and pushes the cap 902 securely into place over the activity region. With the cap 902 in place, the seal between the cap 902 and the access region 908 is substantially resistant to moisture ingress. This means that the aperture for the optional switch 140, the aperture for the pull tab 906, and the aperture for the ambient light sensor 142 are substantially waterproofed from moisture when the cap 902 is mated to the access region 908 in the in the lower surface of the housing 206. This configuration allows the use of the pull tab 904 in the packaging of the lighting device 200. Further, the pull tab may be electrically conductive on two sides and connected to a package switch as disclosed in U.S. patent application Ser. No. 12/236,340 entitled "A Light Device" filed on Sep. 9, 2008, the contents of which are incorporated above by reference in their entirety.

Although the invention has been described in language specific to structural features and/or methodological acts, it is to be understood that the invention defined herein is not necessarily limited to the specific features or acts described. Rather, the specific features and acts are disclosed as exemplary forms of implementing the claimed invention.

FIGS. 21, 22, 23 and 24 show inverted views of an alternative embodiment of the housing of FIGS. 17, 18, 19 and 20. Disposed on the lower surface of the housing 920 is a recessed partially oval shaped access region 908 which is preferably recessed in the lower surface of the housing 920 is a resilient cap 902 preferably affixed by a tether to the housing 920 at one end to avoid the cap 902 becoming lost or dropped during use. The access region 908 preferably has side walls and a rim to snugly and securely mate with the resilient cap 902 when the resilient cap 902 is pressed by a user into the access region 908. The resilient cap 902 is preferable made of an at least partially light transmissive material such as polyvinylchloride (PVC) or silicon rubber.

Figure 21:
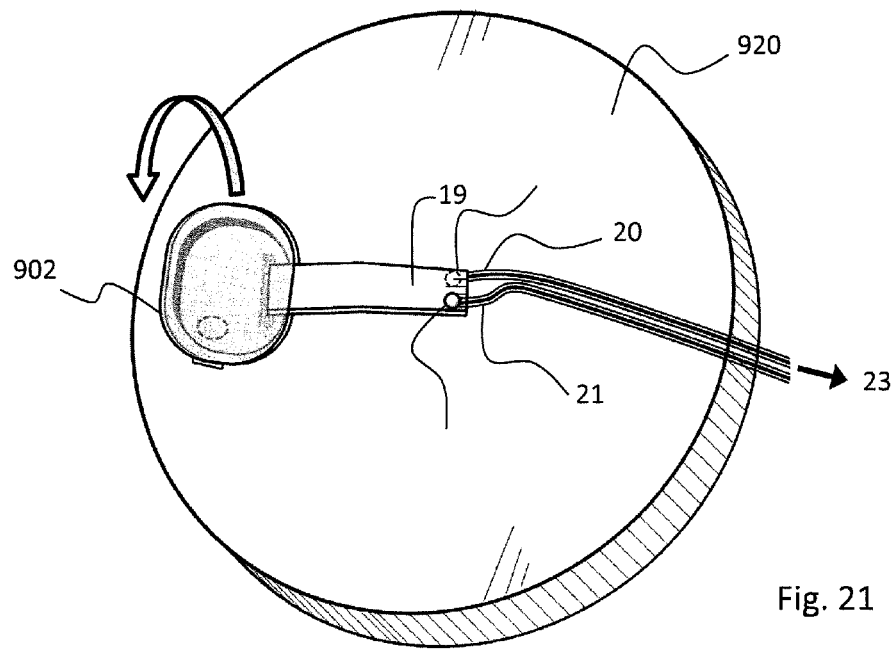
FIG. 21 is a first inverted view of an alternate embodiment of a control housing of the lighting device in accordance with the present invention.
Figure 22:
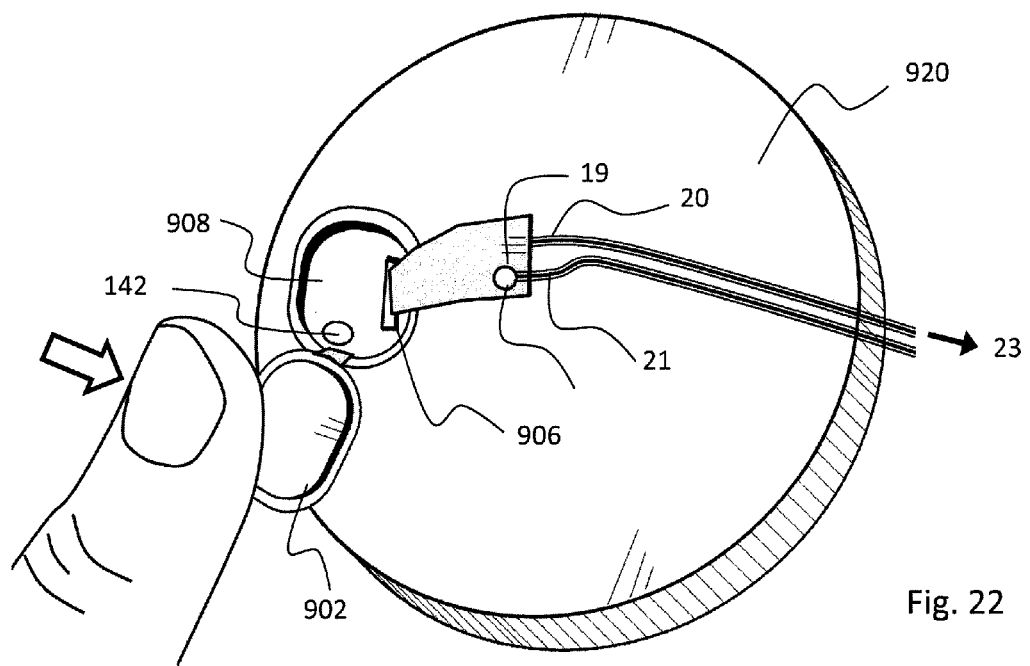
FIG. 22 is a second inverted view of the housing of FIG. 17.

As shown in FIG. 21, when the user remove the new lighting device 200 from its packaging after purchase, a flexible partially-conductive pull tab insulator 904 extends from beneath the closed cap 902. There may be indicia or words printed on the partially-conductive pull tab insulator 904 to instruct the user such as "Open cap, pull tab to activate, close cap before use". Because the partially-conductive pull tab insulator 904 extends beneath the visible portion of the cap 902, it is apparent to a user to access the access region 908 by removing the cap 902 from its position mated to the access region 908. The partially-conductive pull tab insulator 904 acts as an insulator between a rechargeable battery 133 (not shown) and internal battery connections 17 and 18 (not shown) that connect the battery 133 via circuitry to the electrical light source or sources 203. When the partially-conductive pull tab insulator 904 is removed, with any optional switch 140 in an "ON" position, and the ambient light levels are low, an electrical connection is made between the battery 133 and the battery connections 17 and 18 (not shown) and then the lighting device 200 will function normally for normal use. In the embodiment shown in FIGS. 17, 18, 19 and 20, a device switch 140 is co-located in the access region 908. This switch 140 may have the function of switching between various lighting modes or light sources. For example, the switch 140 may be a two position single pole slide switch with one position putting the lighting device 200 into a mode whereby only a single color of light is emitted by the lighting device 200 such as white light. In the second position, the lighting device 200 would be put into a mode whereby a continuous cycle of changing colors is emitted by the lighting device 200. Alternatively the device switch 140 may be a push switch or a rotational switch.

Figure 18:
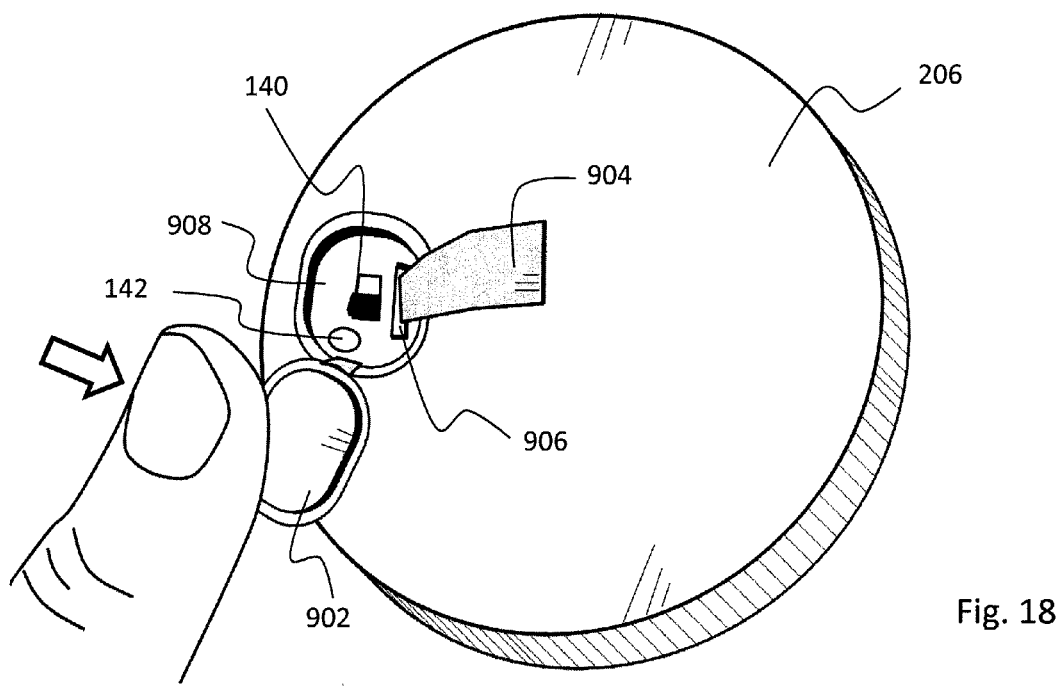
FIG. 18 is a second inverted view of the housing of FIG. 17.

Alternatively as to FIG. 16 wherein the ambient light sensor 142 is located on an upper surface of the housing 206, in this embodiment the ambient light sensor 142 is located on the lower surface of the housing 920 within the access region 908 and there is no device switch 140. In an alternate embodiment there is a device switch 140 located in the access region 908 as shown in FIG. 18. Since the cap 902 is at least partially light transmissive, the ambient light sensor 142 is able to operate from beneath the cap 902 when the cap 902 is mated with the access region 908. Alternatively, the cap 902 is not light-transmissive, there is no ambient light sensor 142 and the circuit senses ambient light levels via detecting current levels produced by the one or more solar panels 130 located on the upper side of the housing.

The battery 133 is at least partially charged when the light device 200 is contained within the package (not shown), and since the ambient light sensor 142 is contained in the package and shielded from ambient light and therefore deprived of light, its main function is to activate the light. To prevent activation of the light source(s) 203 (not shown), the circuit 129 is at least partially disabled by interruption of electricity flowing through at least part of the circuit 129. In this embodiment, the circuit 129 is interrupted by placing insulation in the form of the flexible partially-conductive pull tab insulator 19 between the terminals 15 and 17 (not shown) via a slotted aperture 906 in the recessed partially oval shaped access region 908. The flexible, partially-conductive pull tab insulator 19 electrically isolates the battery terminals 15 and 17 from the battery 133 (not shown). The pull tab insulator 19 is a connector having conductive members (wires) 20 and 21 that extend to a normally-open test switch 23 associated with the packaging. Alternatively, the pull tab insulator is not disposed between the battery 133 and the battery terminals 15 and 17 but is releasably connected to the circuit 129 via a bypass subcircuit as shown in FIG. 15. When the test switch 23 is activated by the user, conductive members 20 and 21 are electrically connected so that electric power is delivered from the battery 133 to a portion of the circuit 129 (not shown) of the lighting device 200 so that the lighting source 203 or 134 is activated. The flexible, partially-conductive pull tab insulator 19 includes an elongated flexible strip having co-extensive longitudinally extending conductive strip portions separated by an insulating strip portion. The test switch 23 (not shown), when operated by a user, electrically connects the conductive strip portions via the conductive members (wires) 20 and 21. The strip 19 would be located between associated terminals 15 and 17, or 16 and 18 (not shown). Preferably the conductive members 20 and 21 are elongated so that the light device 200 may be removed from its packaging without the light device 200 becoming disconnected from the test switch 23.

Figure 23:
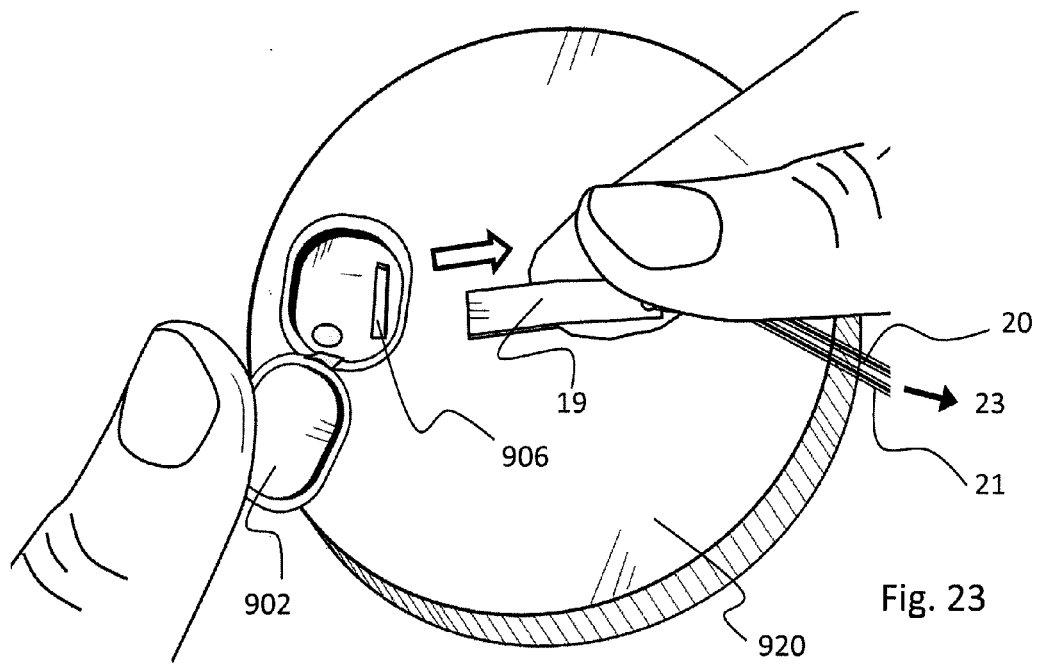
FIG. 23 is a third inverted view of the housing of FIG. 17.

As shown in FIG. 23, the user, as instructed, removes the new lighting device 200 from its packaging after purchase, pulls on the pull-tab insulator 904 and removes the pull-tab insulator 904 from the slotted aperture 906 located in the access region 908.

Figure 24:
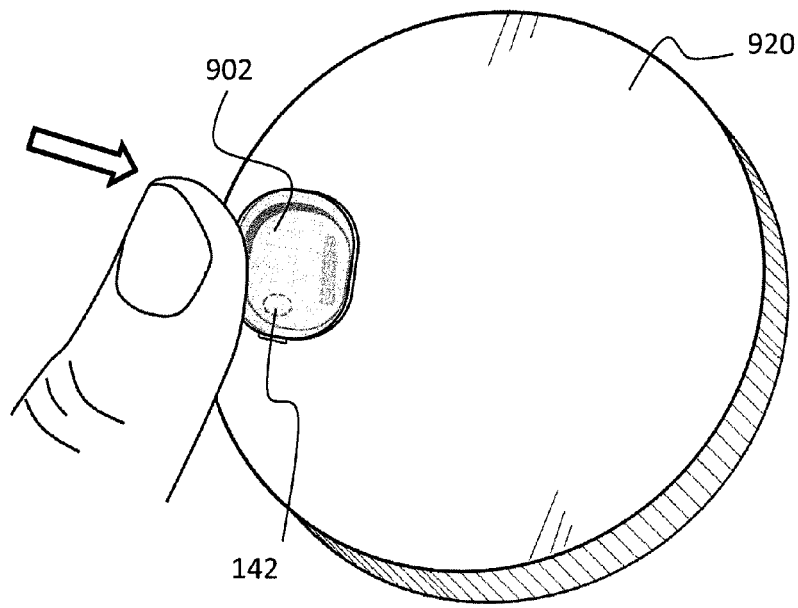
FIG. 24 is a fourth inverted view of the housing of FIG. 17.

As shown in FIG. 24, the user then replaces the cap 902 over the access region 908 and pushes the cap 902 securely into place over the access region 908. With the cap 902 in place, the seal between the cap 902 and the access region 908 is substantially resistant to moisture ingress. This means that the aperture for the partially-conductive pull tab insulator 906 and the aperture for the ambient light sensor 142 are substantially waterproofed from moisture when the cap 902 is mated to the access region 908 in the lower surface of the housing 920. This configuration allows the use of the partially-conductive pull tab insulator 904 in the packaging of the lighting device 200. It also obviates the need for a device switch in some embodiments when only one lighting mode is present in the device.

In an alternative embodiment (not shown) the housing 920 without the device switch 140 includes the non-electrical pull tab 904 implemented in the housing 206 of FIGS. 17 through 20. In this embodiment, the packaging does not have a test or "try-me" function however, the light device 200 avoids the need for a device switch 140 and still maintains a water-resistant housing via use of the cap 902.

Figure 25:
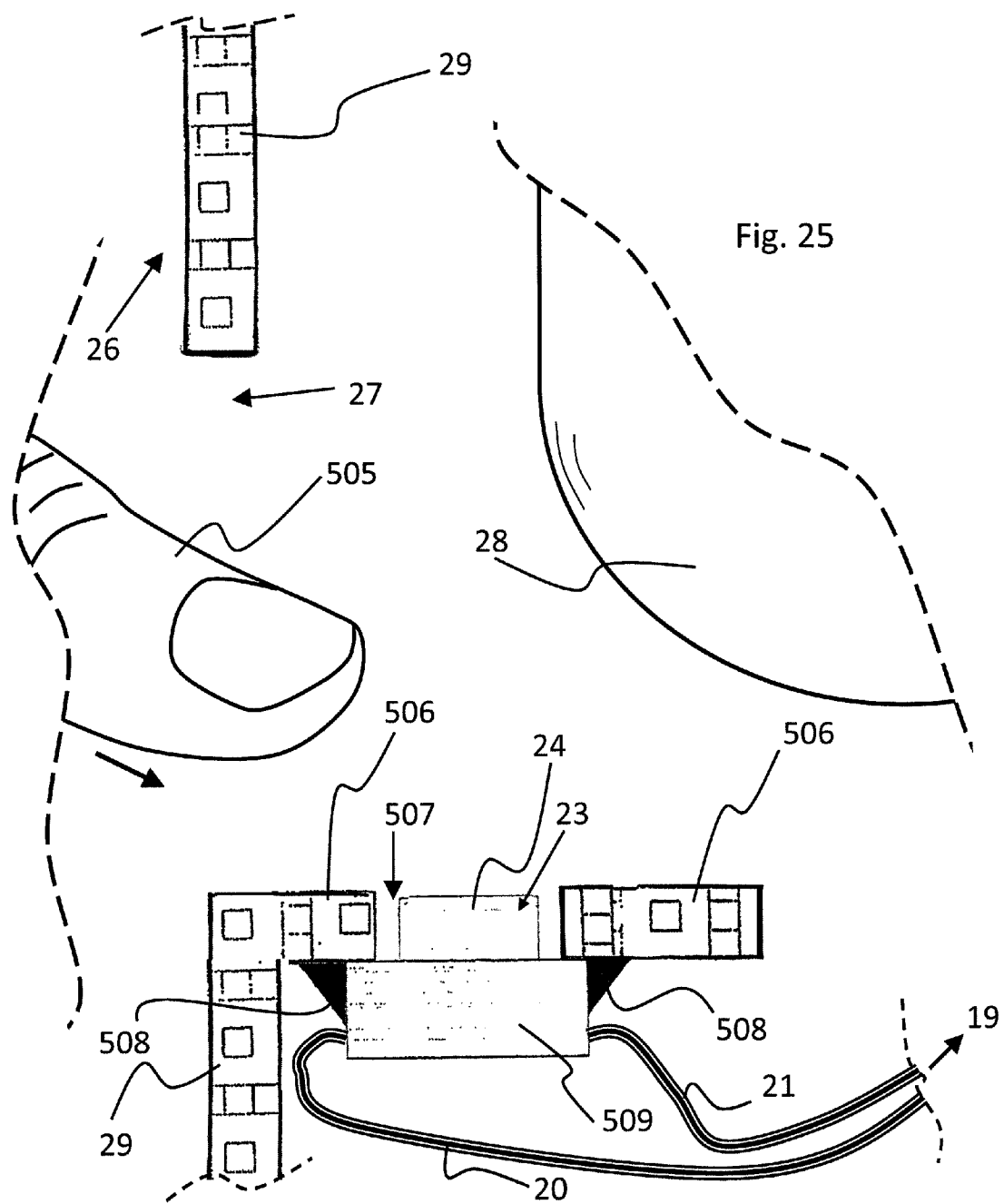
FIG. 25 is a schematic sectioned side elevation of an alternate switch arrange used in an alternate package of a light device.

FIG. 25 shows part of a package 26 including a box having an aperture (window) 27 through which portion of at least one lens 28 of the light device 200 may be viewed by a user 505 so that when the button 24 is depressed by a user 505 via the aperture 27, the lighting device 200 is activated and the emitted light is observed by the user 505 via the aperture 27. The lens 28 may be a shade, a light diffuser, a light transmissive portion of the lamp body. The lens 28 may comprise multiple lenses, or multiple light diffusers each having at least one light emitting element within each lens 28. The test switch 23 is mounted on an inwardly folded portion 506 of a front facing wall 29 of the package 26. The user interface to the test switch 23, being the push button 24 is recessed relative to the wall 29 via attachment of the test switch body to the inwardly folded portion 506 of a front facing wall 29 so as not to protrude beyond the wall 29 so that when multiple packages 26 are packed close together or stacked, the button 24 and thus test switch 23 cannot accidentally be activated.

The test switch 23 includes a switch body 509 with a outwardly extending flange that is affixed to a horizontal portion of the inside of the inwardly folded portion 506 behind a second aperture 507 located on the inwardly folded portion 506 wherein the button 24 is accessed by the user 505 through the second aperture 507. The switch body 509 is secured to the inwardly folded portion 506 via securing means such as glue or resin 508 such as commonly-found hot-melt glue. The securing means may include a press fit, or support from a part of the internal structure of the package 26 to the rear of the switch body 509. This securing means inhibits displacement of the test switch 23 inwardly of the inwardly folded portion 506 when the button 24 is depressed. The button 24 and test switch 23 combination may alternatively be replaced with a switch actuator only that has no button cover. The depressible button 24 that covers the test switch 23 may be a resilient tab portion of part of the package 26, either part of the wall 29 or part of an internal structure of the package 26.

When a user is considering purchasing the light device 200, (and although this should be discouraged) the person may wish to open the device package 26 in the retail store so as to more closely inspect the light device 200. In order to avoid creation of tension between the test button 24 and the removable connector (which may be insulator 19), resulting in damage to the test system of the device packaging 26, one or more of the conductive wires 20 and 21 extending between the test button 24 and the insert 19 may be folded back on itself and the folded portion potted with glue or resin to creates a strain relief point. This strain relief of the connection point between the switch body 509 and the conductors 20 and 21, preferably via the use of glue or resin may be incorporated as a single affixing method with securing the switch body 509 to the inwardly folded portion 506.

Figure 26:
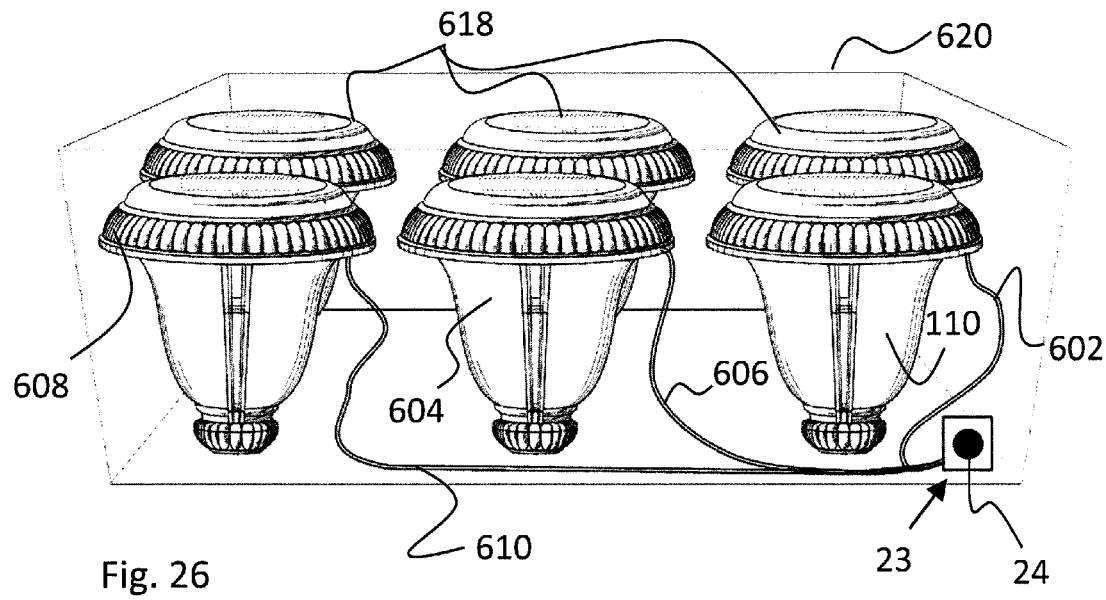
FIG. 26 is a schematic perspective elevation of an alternative embodiment of a packaging containing a plurality of light devices.

FIG. 26 shows schematic of a further embodiment of the package shown in FIG. 2. In FIG. 26, the package 620 contains a plurality of rechargeable battery powered light fixtures each having a body portion, lens, connections for a rechargeable battery, and at least one battery with the fixtures preferably being solar powered light fixtures, but which may be non-solar rechargeable light fixtures. It shows test switch 23 electrically connected to a first light fixture 110 via a first pair of conductors 602. Test switch 23 is also electrically connected to a second light fixture 604 via a second pair of conductors 606, and is further electrically connected to a third light fixture 608 via a third pair of conductors 610. FIG. 26 further discloses additional light fixtures 620 disposed within the package 620 that are not connected to the test switch 23. Thus, in the embodiment of FIG. 26 there is a package 620 having a predetermined numerical quantity of solar powered light fixtures (in this instance six fixtures) where less than the predetermined quantity (i.e. less than six) of the solar powered light fixtures are connected to the test switch 23. Alternatively, all six of the fixtures 618, 110, 604 and 608 may be connected to the test switch 23.

Figure 27:
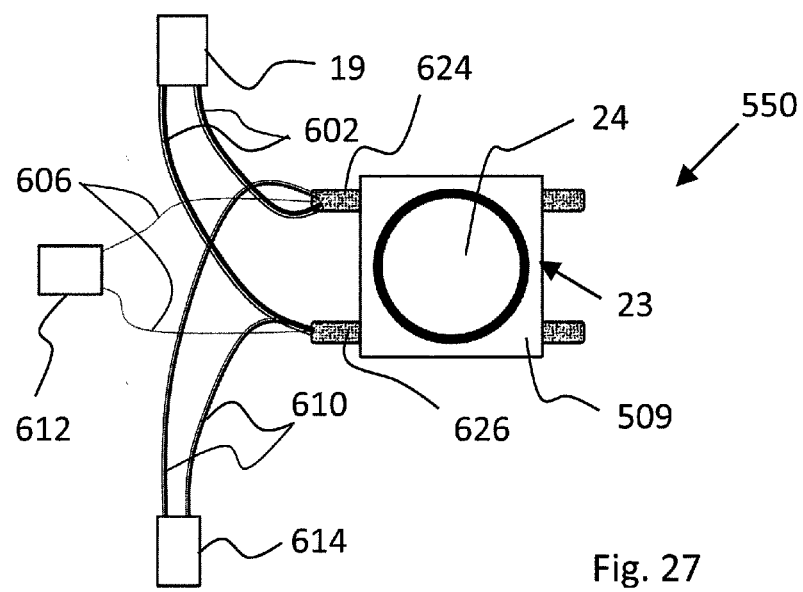
FIG. 27 is a diagrammatic view of a switch and test componentry employed in the packaging of FIG. 26.

FIG. 27. Shows a schematic of the test system 550 utilized in the package 620 of FIG. 26. It shown a switch body 509 having a depressible button 24 that when depressed can close test switch 23. Connected across each of the switch contacts 624 and 626 are pairs of conductors that each electrically connect to a connector, which in this embodiment is a flexible, partially-conductive pull tab insulator constructed as shown in FIGS. 19 to 24. The pairs of conductors are the first pair of conductors 602, the second pair of conductors 606 and the third pair of conductors 610. The first pair of conductors 602 is attached to a first connector 19, the second pair of conductors is attached to a second connector 612 and the third pair of conductors is attached to a third connector 614. The first connector 19 is releasably connected to the first light fixture 110 of FIG. 26. The second connector 612 is releasably connected to the second light fixture 604 and the third connector 614 is releasably connected to the third light fixture 608. Thus when the test button 24 is depressed, test switch 23 will close, current will flow along all three conductors 602, 606 and 610, and a portion of each of the first 110, second 604 and third 608 light fixtures will illuminate from within. Since each fixture has its own associated battery to supply power to its associated lighting element(s), the test feature can be actuated many times without draining all three batteries.

As mentioned above, in one embodiment, a plurality of body portions are provided, each body portion having at least one associated light emitting element, and the body portions being disposed in a generally linear configuration during use. Each body portion has at least a partly light transmissive region to allow emitted light from at least one associated light emitting element to be viewed from a position external to the body portion. The body portion may be entirely light transmissive, such that the body portion is a lens or diffuser.

Figure 28:
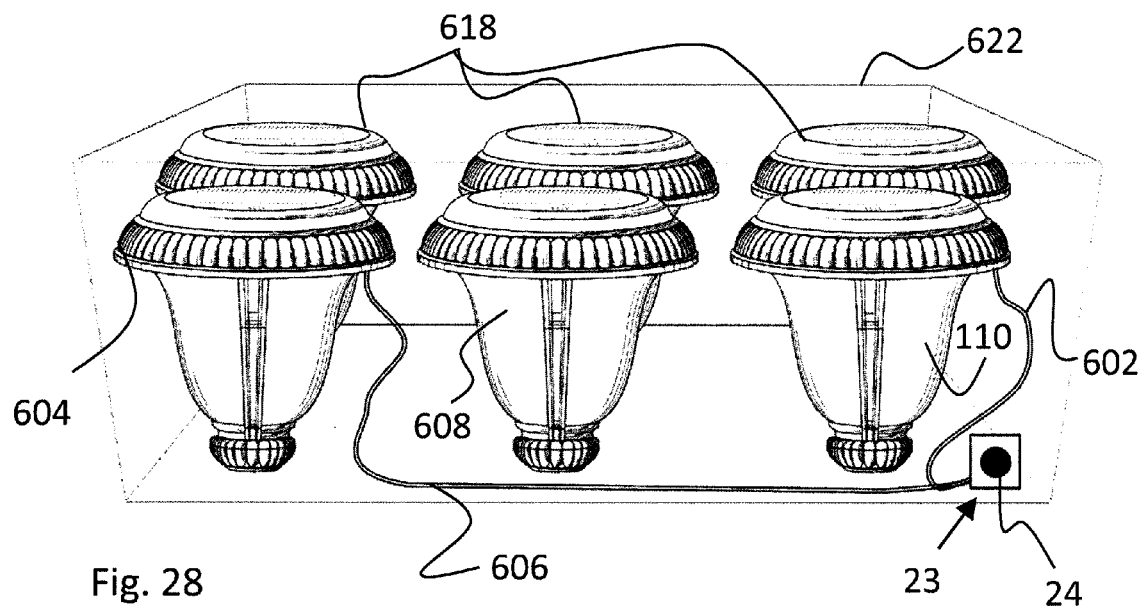
FIG. 28 is a schematic perspective elevation of an alternative embodiment of the packaging of FIG. 26.
Figure 29:
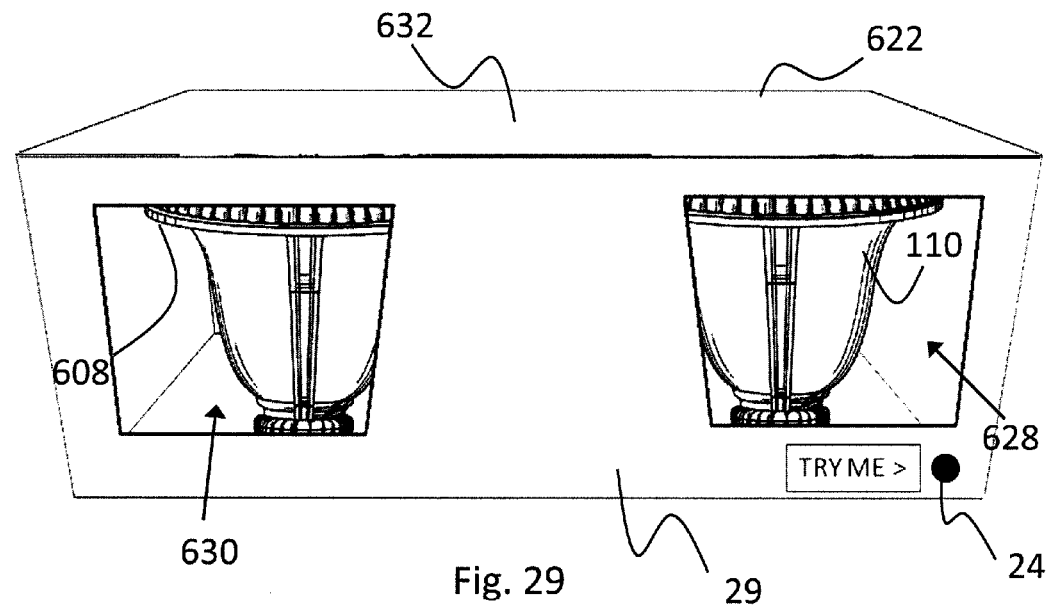
FIG. 29 is a perspective elevation of the packaging of FIG. 28.

FIG. 28 shows a schematic view an alternative embodiment to the package 620 of FIG. 26. In FIG. 28, the package 622 contains a plurality of rechargeable battery powered light fixtures 110, 604, 608 and 618 each having a body portion, lens, connections for a rechargeable battery, and at least one battery with the fixtures preferably being solar powered light fixtures. It shows test switch 23 electrically connected to a first light fixture 110 via a first pair of conductors 602. Test switch 23 is also electrically connected to a second light fixture 604 via a second pair of conductors 606. In this embodiment, only two of the light fixtures are connected to the test switch 23 and illuminated via button 24.

FIG. 28 shows the package 622 of FIG. 28 in a perspective view. It shows the front face wall 29 of the package 622 having a first window or aperture 628 through which a portion of the first light fixture 110 is visible as disclosed above in FIG. 2. However, differently to FIG. 2, this embodiment has a second window 630 on the front face wall 29 through which the second light fixture 608 is at least partly visible. The test button 24 is disposed on the front face wall 29 of the package 622 (as shown in FIG. 12) so as to be accessible to a user without opening the package 622. Alternatively, the test button 24 is recessed within the first window 628 in a manner disclosed in FIG. 25.

Preferably, each light fixture includes a device switch 140 operable by a user to control delivery of electric power from its battery to operate its circuit 129 connected to control electric power to the light emitting element(s) contained therein.

Figure 30:
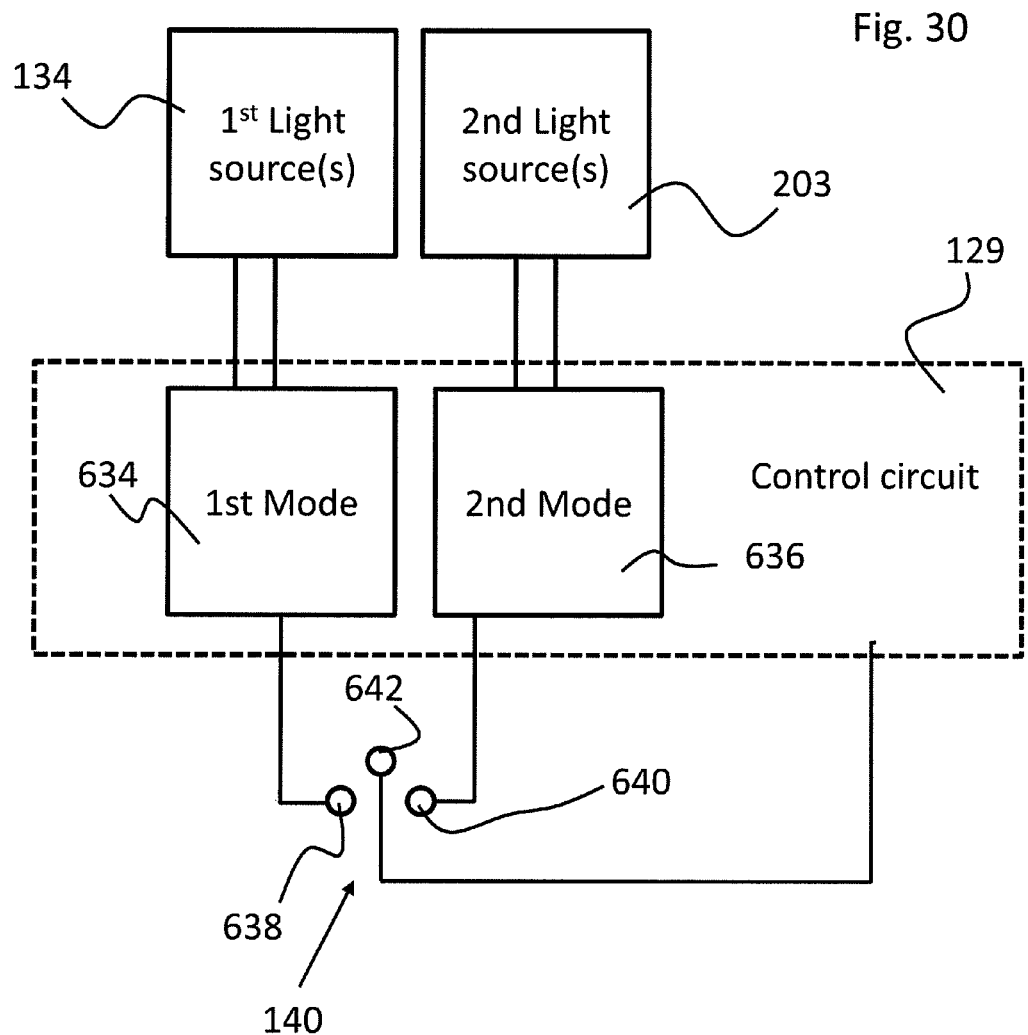
FIG. 30 is a schematic diagram of a first test arrangement for facilitating testing of the light devices of FIG. 28.
Figure 31:
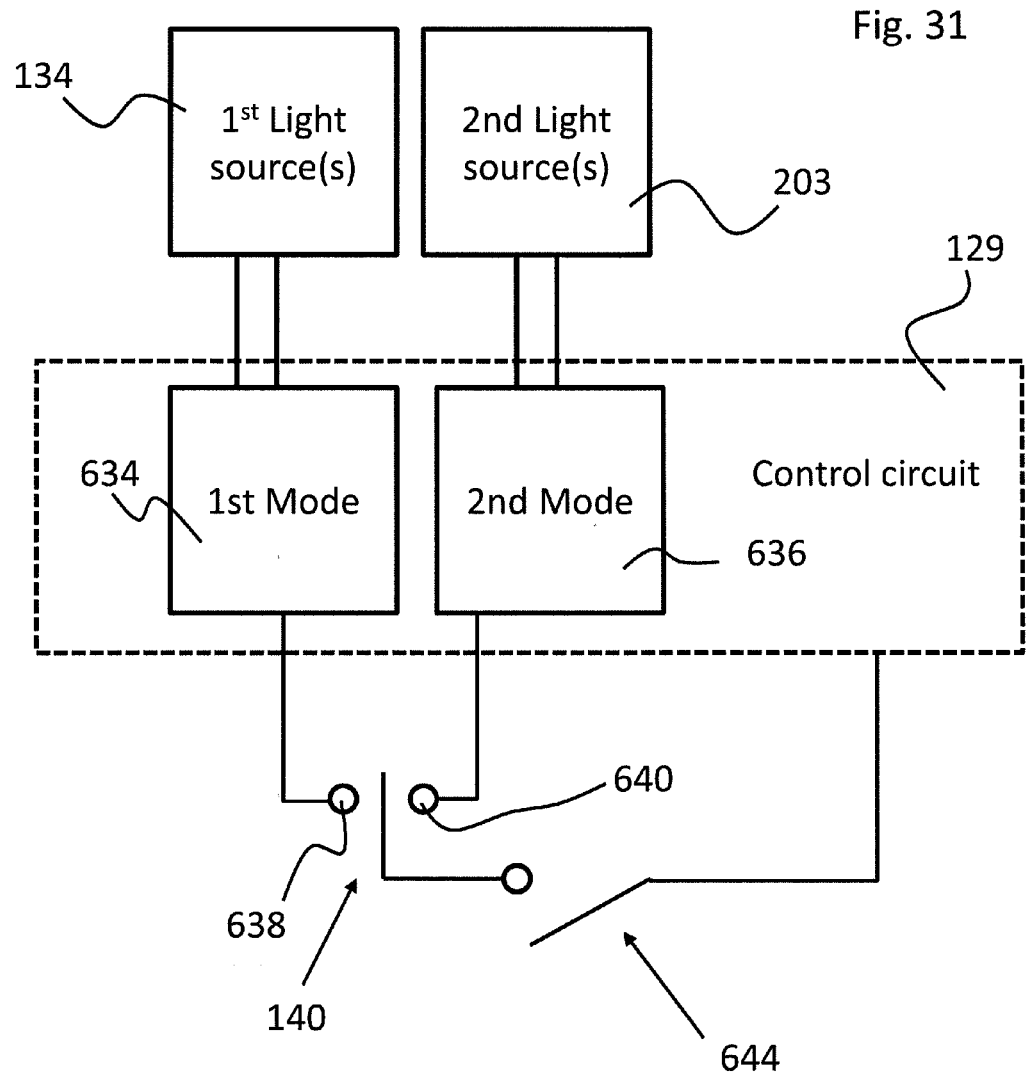
FIG. 31 is a schematic diagram of a first alternate test arrangement for facilitating testing of the light devices of FIG. 30.
Figure 32:
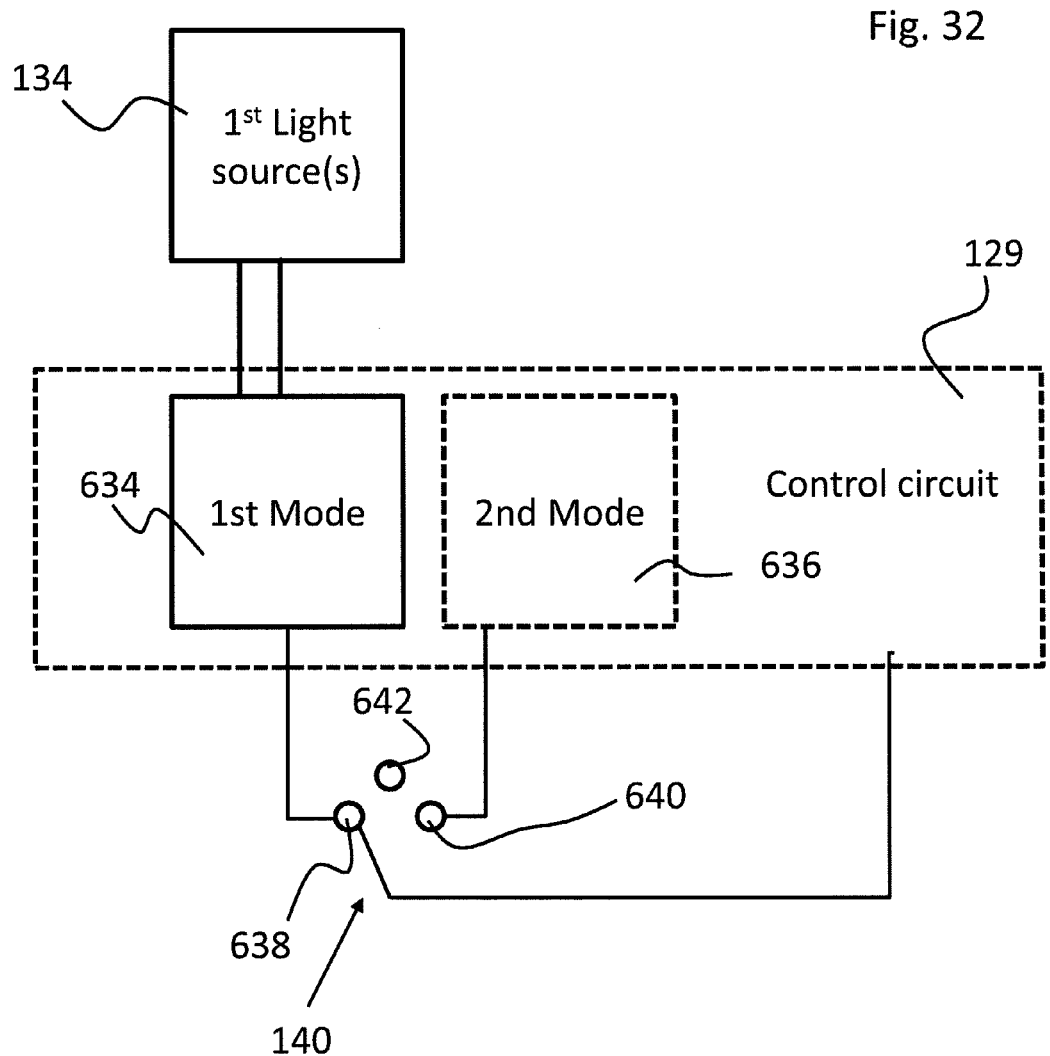
FIG. 32 is further schematic diagram of the first test arrangement of FIG. 30 showing the test arrangement in a first mode.
Figure 33:
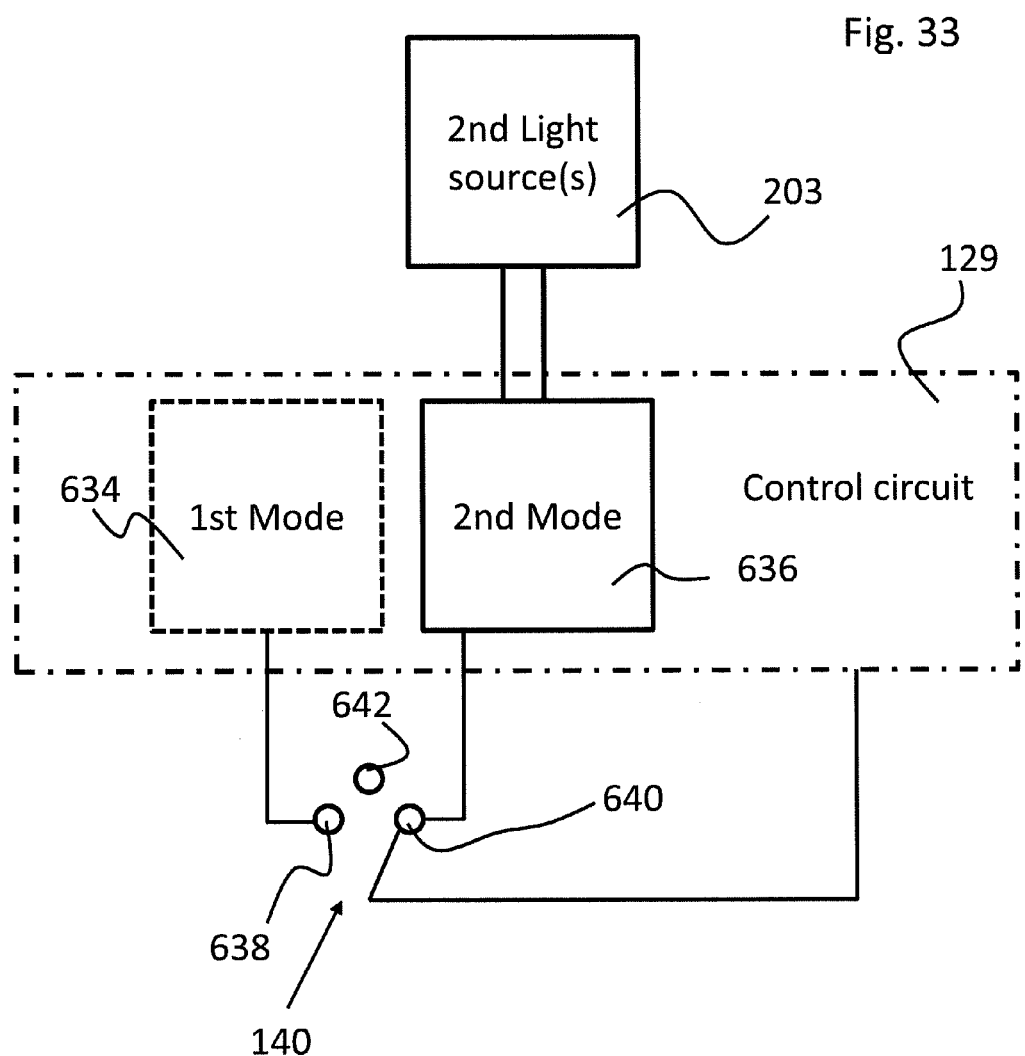
FIG. 33 is a further schematic diagram of the first test arrangement of FIG. 30 showing the test arrangement in a second mode.

As shown in FIGS. 30 to 33, each light fixture contains a first lighting mode 634 and a second lighting mode 636, with selection of the lighting mode controlled via the device switch 140. The first lighting mode 634 is preferably a mode wherein three diodes 134 that emit different colors are illuminated in a predetermined sequence. The second lighting mode 636 is a mode wherein a constant wavelength or color of light is emitted from the light fixture, for example, a constant white emitted light which may be produced by a separate light source such a white light emitting diode 203 (as shown in FIG. 30) or may be produced by a combination of the three diodes 134 used in the first lighting mode 634 (not shown). The device switch 140 has at least two fixed positions with the first position 638 causing the circuit to implement the first lighting mode 634 (as shown in FIG. 32) and the second device switch position 640 causing the circuit to implement the second lighting mode 636 (as shown in FIG. 33). In this embodiment, there is an optional third device switch position 642 where the control circuit is not activated in any mode, commonly known as the "OFF" position. Thus FIG. 30 shows a three position switch 140. Alternatively as shown in FIG. 31, the device switch 140 is a first device switch being a two position switch and there is a second device switch 644 which is an ON/OFF switch. In a further alternate embodiment to FIG. 31. The device switch 140 is a two position device switch 140 with no "OFF" position and there is no second switch 644 having and "OFF" function or position.

The device switch 140 associated with the first light fixture 110 is positioned in the first device switch position 638 causing the circuit 129 of the first light fixture 110 to implement the first lighting mode 634 and The device switch 140 associated with the second light fixture 604 is positioned in the second device switch position 640 causing the circuit 129 of the second light fixture 604 to implement the second lighting mode 636 when a user closes the test switch 23 by depressing test button 24 so that a portion of the first light device 110 displaying the first lighting mode 634 is visible by a user 505 via the first window 628 and a portion of the second light device 608 displaying the second lighting mode 636 is visible by the user via the second window 630. Alternatively, the two windows 630 and 628 are combined as a single window or viewing region. A lighting mode may be a color changing mode, a flashing mode, a dual-brightness mode, a fixed brightness mode, a fixed emitted color mode, a mode whereby the perceived emitted color varies in brightness and/or color over time, or a combination of some of these modes.

Although the invention has been described in language specific to structural features and/or methodological acts, it is to be understood that the invention defined herein is not necessarily limited to the specific features or acts described. Rather, the specific features and acts are disclosed as exemplary forms of implementing the claimed invention.

What is claimed is:

1. A light device and package comprising:
   at least one light device comprising:
      at least one diffuser;
      at least one light emitting element which receives electrical power from an electrical power storage device disposed during use in said light device, said at least one light emitting element being arranged so as to generate light through said at least one diffuser;
      a photovoltaic device for recharging said electrical power storage device;
      control circuitry arranged to control power supplied from said electrical power storage device to said at least one light emitting element during use;
   a test device comprising:
   at least two conductors comprising a first electrical conductor and a second electrical conductor;
   a test switch connected across said at least two conductors;
   a device package comprising:
      an opaque package portion and
      at least one light transmissive package portion;
   wherein said device package contains said at least one light device and said at least two conductors;
   wherein said test device is removably connected to said control circuitry, said test device being disposable in a first configuration wherein said test switch is connected between said electrical storage device and said at least one light emitting element via said at least two conductors, and a second configuration wherein said test switch and said at least two conductors are disconnected from said electrical storage device and said at least one light emitting element;
   wherein in said first configuration said test switch is supported by said device package to provide access to operate said test switch by a user located external from said device package; and wherein some of said emitted light is viewable by a user through said at least one light transmissive package portion when said test switch is disposed by said user in said first configuration.

2. The light device and package of claim 1, wherein said at least one light device further comprises a light activation sub-circuit to activate said at least one light emitting element at low ambient light levels; and wherein said opaque package portion shields a part of said light device from ambient light so as to activate said light activation sub-circuit when said test switch is disposed by said user in said first configuration.

3. The light device and package of claim 1, wherein said at least one light device further comprises at least one device switch operable to control at least part of said control circuitry, thereby enabling a user to manipulate said at least one device switch after said test device is detached from said control circuitry.

4. The light device and package of claim 1, wherein said at least one light emitting element is a plurality of light emitting elements.

5. The light device and package of claim 4, wherein said at least one diffuser is a plurality of diffusers including diffusers selected from the group consisting of transparent, partially transparent, translucent, and partially transparent and translucent diffusers disposed in a generally linear configuration during normal use; and
wherein said plurality of light emitting elements are arranged so as to generate said emitted light which passes at least partially through each of said diffusers.

6. The light device and package of claim 1, further comprising a pole portion for elevating said photovoltaic device above a surrounding substrate when said photovoltaic device is supplying power to charge said electrical power storage device.

7. The light device and package of claim 1,
wherein said at least one light device includes a first light device and a second light device;
wherein said at least two conductors includes a first pair of conductors and a second pair of conductors;
wherein said test switch is connected across said first pair of conductors to said first light device and said second pair of conductors to said second light device;
wherein each of said first and second pairs connect to said test device in said first configuration and said second configuration.

8. The light device and package of claim 7, wherein said first and second light devices each comprises at least one device switch operable to control at least part of said control circuitry; and
wherein an aperture in an outer surface of said device package includes a first window and a second window in said outer surface;
wherein said device switch of said first light device is positioned in a first device switch position causing said control circuitry to implement a first lighting mode;
wherein said device switch of said second light device is positioned in a second device switch position causing said circuitry to implement a second lighting mode so that a portion of said first light device displaying said first lighting mode is visible by said user via said first window and a portion of said second light device displaying a second lighting mode visible by said user via said second window when said test switch is disposed in said first configuration.

9. The light device and package of claim 8, wherein said first and second lighting mode is selected from the lighting mode group consisting of a color changing mode, a flashing mode, a dual-brightness mode, a fixed brightness mode, a fixed emitted color mode, a mode wherein the perceived emitted color varies in brightness, a mode wherein the perceived emitted color varies in color over time and any combination thereof.

10. The light device and package of claim 1, wherein said test switch is urged into a disengaged position when not activated by said user.

11. The light device and package of claim 1, wherein said test switch is recessed relative to an outer surface of said device package and wherein said device package further comprises an aperture in said outer surface to provide said access via said aperture.

12. A light device and packaging comprising:
at least one light device comprising:
at least one diffuser;
at least one light emitting element which receives electrical power from an electrical power storage device disposed during use in said light device, said at least one light emitting element being arranged so as to emit light through said at least one diffuser;
a photovoltaic device for recharging said electrical power storage device;
control circuitry arranged to control power supplied from said electrical power storage device to said at least one light emitting element during use;
a packaging comprising at least one wall;
a test device comprising:
at least two conductors comprising a first electrical conductor and a second electrical conductor;
a test switch connected across said at least two conductors;
wherein said test switch is fixed to said wall and positioned to enable a user to operate said test switch;
wherein said test device is removably connected to said control circuitry, said test device being disposable in a first configuration wherein said test switch is connected between said electrical power storage device and said at least one light emitting element via said at least two conductors, and a second configuration wherein said test switch and said at least two conductors are disconnected from said electrical storage device and said at least one light emitting element; and
wherein in said first configuration, said test switch is at least partially supported by said packaging portion to provide access for a user to operate said test switch; and
wherein some of said emitted light is viewable by said user through said at least one diffuser when said test switch is disposed by said user in said first configuration.

13. The light device and packaging of claim 12, wherein said at least one light device further comprises a light activation sub-circuit to activate said at least one light emitting element at low ambient light levels;
wherein said light device and packaging further comprises a second packaging portion; and
wherein said second packaging portion shields a part of said at least one light device from ambient light so as to activate said light activation sub-circuit when said test switch is disposed by said user in said first configuration.

14. The light device and packaging of claim 12, wherein said wall further comprises an aperture and wherein said test switch is positioned to enable said user to operate said test switch via said aperture.

* * * * *